(12) United States Patent
Yamamuro

(10) Patent No.: US 11,511,764 B2
(45) Date of Patent: Nov. 29, 2022

(54) COMMUNICATION APPARATUS, COMMUNICATION SYSTEM, VEHICLE, NON-TRANSITORY COMPUTER-READABLE MEDIUM, AND COMMUNICATION METHOD

(71) Applicant: TOYOTA JIDOSHA KABUSHIKI KAISHA, Toyota (JP)

(72) Inventor: Akihiko Yamamuro, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 69 days.

(21) Appl. No.: 17/172,918

(22) Filed: Feb. 10, 2021

(65) Prior Publication Data
US 2021/0284185 A1     Sep. 16, 2021

(30) Foreign Application Priority Data

Mar. 13, 2020 (JP) .............................. JP2020-044580

(51) Int. Cl.
*B60W 50/08* (2020.01)
*B60W 30/18* (2012.01)
*H04W 4/46* (2018.01)

(52) U.S. Cl.
CPC .... *B60W 50/087* (2013.01); *B60W 30/18109* (2013.01); *B60W 50/085* (2013.01); *H04W 4/46* (2018.02)

(58) Field of Classification Search
CPC .................................................... H04W 4/46
See application file for complete search history.

(56) References Cited

U.S. PATENT DOCUMENTS

| 11,146,918 B2* | 10/2021 | Rao ................... B62D 15/0285 |
| 2019/0004179 A1* | 1/2019 | Hwang ............ G08G 1/096716 |
| 2019/0300018 A1 | 10/2019 | Shibata |
| 2020/0122744 A1* | 4/2020 | Badigannavar ........ G08G 1/144 |
| 2020/0229065 A1* | 7/2020 | Iwata ...................... H04W 4/44 |

FOREIGN PATENT DOCUMENTS

| JP | 2015-065625 A | 4/2015 |
| JP | 2017-142579 A | 8/2017 |
| JP | 2019-185124 A | 10/2019 |
| JP | 2020-184194 A | 11/2020 |

OTHER PUBLICATIONS

European Telecommunication Standards Institute (ETSI) EN 302 637-3 V1.2.1, 2014.

* cited by examiner

*Primary Examiner* — Russell Frejd
*Assistant Examiner* — Sara J Lewandroski
(74) *Attorney, Agent, or Firm* — Oliff PLC

(57) ABSTRACT

A communication apparatus is mounted on a first vehicle. The communication apparatus comprises: a communication interface configured to perform wireless communication with a communication apparatus mounted on a vehicle other than the first vehicle; and a controller configured to: determine, when event information is received by the communication interface, the event information indicating occurrence of an event and having been transferred from a communication apparatus mounted on a second vehicle different from the first vehicle, a status of a third vehicle different from the first vehicle and the second vehicle, and decide, based on result of the determination, whether to cause the communication interface to perform transfer of the event information to a communication apparatus mounted on the third vehicle.

17 Claims, 18 Drawing Sheets

COMMUNICATION APPARATUS, COMMUNICATION SYSTEM, VEHICLE, NON-TRANSITORY COMPUTER-READABLE MEDIUM, AND COMMUNICATION METHOD

CROSS-REFERENCE TO RELATED APPLICATION

This application claims priority to Japanese Patent Application No. 2020-044580 filed on Mar. 13, 2020, the entire disclosure of which is incorporated herein by reference.

TECHNICAL FIELD

The present disclosure relates to a communication apparatus, a communication system, a vehicle, a communication program, and a communication method.

BACKGROUND

Patent Literature (PTL) 1 discloses a driving support technology using inter-vehicle communication. More specifically, PTL 1 discloses a driving support technology for notifying a driver of a danger of collision with another vehicle based on a signal received from the another vehicle.

CITATION LIST

Patent Literature

PTL 1: JP 2019-185124 A

Non-Patent Literature

NPTL 1: European Telecommunication Standards Institute (ETSI) EN 302 637-3 V1.2.1 (2014 September)

SUMMARY

According to the technology of PTL 1, there is a problem in that information that is unnecessary for a driver may be transferred from other vehicles.

It would be helpful to reduce the transfer of information that is unnecessary for a driver of a vehicle that is an information transfer target.

A communication apparatus according to an embodiment disclosed herein is a communication apparatus mounted on a first vehicle,
  the communication apparatus including a communication interface and a controller, wherein:
  the communication interface is configured to perform wireless communication with a communication apparatus mounted on a vehicle other than the first vehicle: and
  the controller is configured to:
    determine, when event information is received by the communication interface, the event information indicating occurrence of an event and having been transferred from a communication apparatus mounted on a second vehicle different from the first vehicle, a status of a third vehicle different from the first vehicle and the second vehicle, and
    decide, based on a result of the determination, whether to cause the communication interface to perform transfer of the event information to a communication apparatus mounted on the third vehicle.

A communication program according to an embodiment disclosed herein is configured to cause a computer mounted on a first vehicle to execute operations. The operations include:
  determining, when event information is received by the communication interface, the event information indicating occurrence of an event and having been transferred from a communication apparatus mounted on a second vehicle different from the first vehicle, a status of a third vehicle different from the first vehicle and the second vehicle, and
  deciding, based on a result of the determination, whether to cause the first vehicle to perform transfer of the event information to the third vehicle.

A communication method according to an embodiment disclosed herein includes:
  transferring, to a first vehicle from a second vehicle different from the first vehicle, event information that indicates occurrence of an event;
  determining, by the first vehicle, a status of a third vehicle different from the first vehicle and the second vehicle; and
  deciding, by the first vehicle, whether to transfer the event information to the third vehicle, based on a result of the determination.

According to the present disclosure, it is possible to reduce transfer of information that is unnecessary for a driver of a vehicle that is an information transfer target.

DETAILED DESCRIPTION

Figure 1:
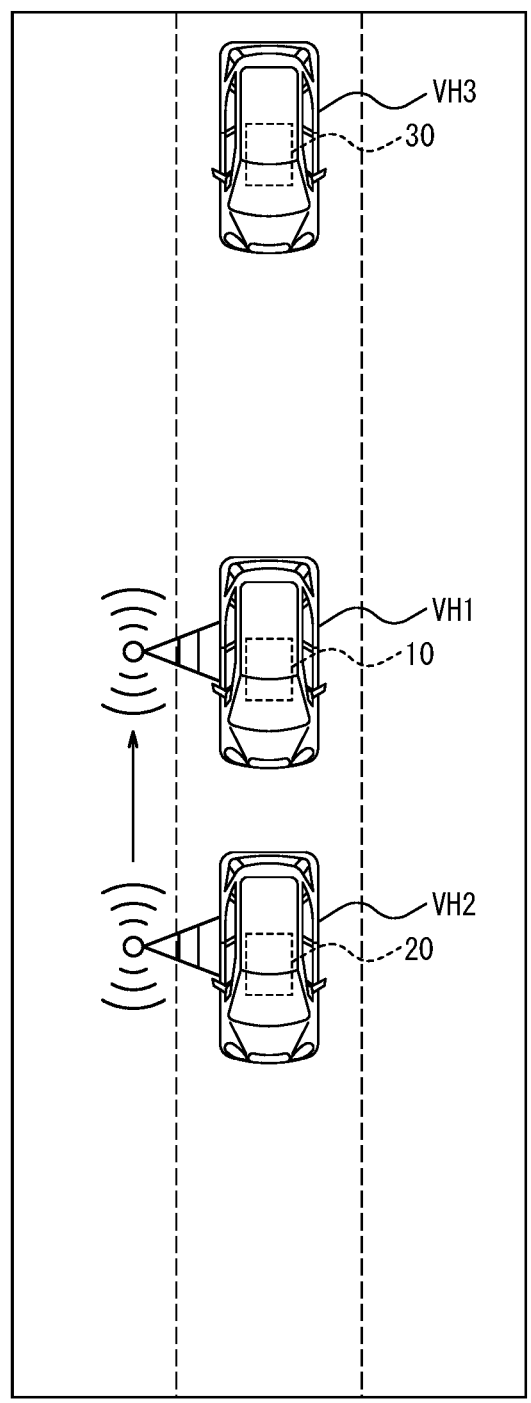
FIG. 1 is a diagram illustrating a configuration of a communication system according to an embodiment disclosed herein.

An embodiment disclosed herein will be explained in below, with reference to the drawings.

In the drawings, the same or corresponding components are denoted herein by the same numerals. In the description of the present embodiment, descriptions of the same or corresponding components are simplified or omitted as appropriate.

A configuration of the communication system 1 according to the present embodiment is explained with reference to FIG. 1.

The communication system 1 according to the present embodiment includes a communication apparatus 10 mounted on a first vehicle VH1, a communication apparatus 20 mounted on a second vehicle VH2 different from the first vehicle VH1, and a communication apparatus 30 mounted on a third vehicle VH3 different from the first vehicle VH1 and the second vehicle VH2. In FIG. 1, the broken line is a lane division line. In FIG. 1, the first vehicle VH1, the second vehicle VH2, and the third vehicle VH3 are traveling in the same lane; however, the present embodiment is not limited thereto and each of the vehicles may be traveling in different lanes.

The communication apparatus 10 of the first vehicle VH1 is a vehicle-to-vehicle communication apparatus configured to perform vehicle-to-vehicle communication with the communication apparatus 20 of the second vehicle VH2 and with the communication apparatus 30 of the third vehicle VH3, over a multihop wireless network such as ad hoc network. Specifically, the communication apparatus 10, the communication apparatus 20, and the communication apparatus 30 transfer information through multihop routing. In the present embodiment, a message for notifying the occurrence of an event, which has been transferred from the communication apparatus 20, is further transferred as necessary from the communication apparatus 10 to the communication apparatus 30 through multihop routing. This message may be any type of message. In the present embodiment, the message is a DENM as defined in NPTL 1. "DENM" is an abbreviation of Decentralized Environmental Notification Message.

Examples of the first vehicle VH1, the second vehicle VH2, and the third vehicle VH3 may include any kind of automobile, such as a gasoline-powered vehicle, a diesel-powered vehicle, HV, PHV, EV, or FCV. "HV" is an abbreviation of Hybrid Vehicle. "PHV" is an abbreviation of Plug-in Hybrid Vehicle. "EV" is an abbreviation of Electric Vehicle. "FCV" is an abbreviation of Fuel Cell Vehicle. The first vehicle VH1, the second vehicle VH2, and the third vehicle VH3, which are each driven by a driver in the present embodiment, may be automated at any level. The level of automation is, for example, any one of Level 1 to Level 5 according to the level classification defined by SAE. "SAE" is an abbreviation of Society of Automotive Engineers. The first vehicle VH1, the second vehicle VH2, and the third vehicle VH3 may each be a multi-purpose autonomous driving EV for MaaS. "MaaS" is an abbreviation of Mobility as a Service.

An outline of the present embodiment will be described with reference to FIG. 1.

In the communication system 1 according to the present embodiment, event information that indicates the occurrence of an event is transferred to the first vehicle VH1 from the second vehicle VH2 that is different from the first vehicle VH1. The first vehicle VH1 determines a status of the third vehicle VH3 that is different from the first vehicle VH1 and the second vehicle VH2. Based on the result of the determination, the first vehicle VH1 decides whether to perform transfer of the event information to the third vehicle VH3. In the present embodiment, the first vehicle VH1 evaluates a necessity level for transfer of the event information to the third vehicle VH3 based on the result of the determination, and decides whether to perform transfer of the event information in accordance with the evaluated necessity level.

In the present embodiment, the "event" refers to a phenomenon that has occurred on a road. Examples of the event include road works, emergency braking, or approach of an emergency vehicle. Examples of the emergency vehicle include an ambulance, a fire engine, or a patrol car.

In the present embodiment, the "event information" refers to information that indicates the occurrence of an event. Examples of the event information include information that indicates the details of the event, information that indicates the occurrence position of the event, or information that indicates the event lane which is the lane in which the event has occurred. The event information may include information that indicates the direction to the occurrence position of the event as viewed from the first vehicle VH1. When the event is the approach of an emergency vehicle, information that indicates the speed of the event may be included in the event information.

In the present embodiment, the "necessity level for transfer" is an index that indicates the degree of necessity for transferring information. The necessity level for transfer, which may be calculated by any method, may be calculated using a score calculation, a grading evaluation, or an evaluation function. The term "transfer" as used herein refers to sending or forwarding information to a further destination.

According to the present embodiment, whether to perform transfer of the event information is decided in accordance with the necessity level for transfer, to thereby reduce the transfer of information unnecessary for the driver of a vehicle that is an information transfer target.

The transfer of unnecessary event information may be reduced, so as to reduce the likelihood of causing a driver to feel annoyed or in danger, and thereby improve driving safety. Further, by reducing the number of transfers, an increase in the amount of information traffic due to transfer is prevented and communication delay can be suppressed.

Figure 2:
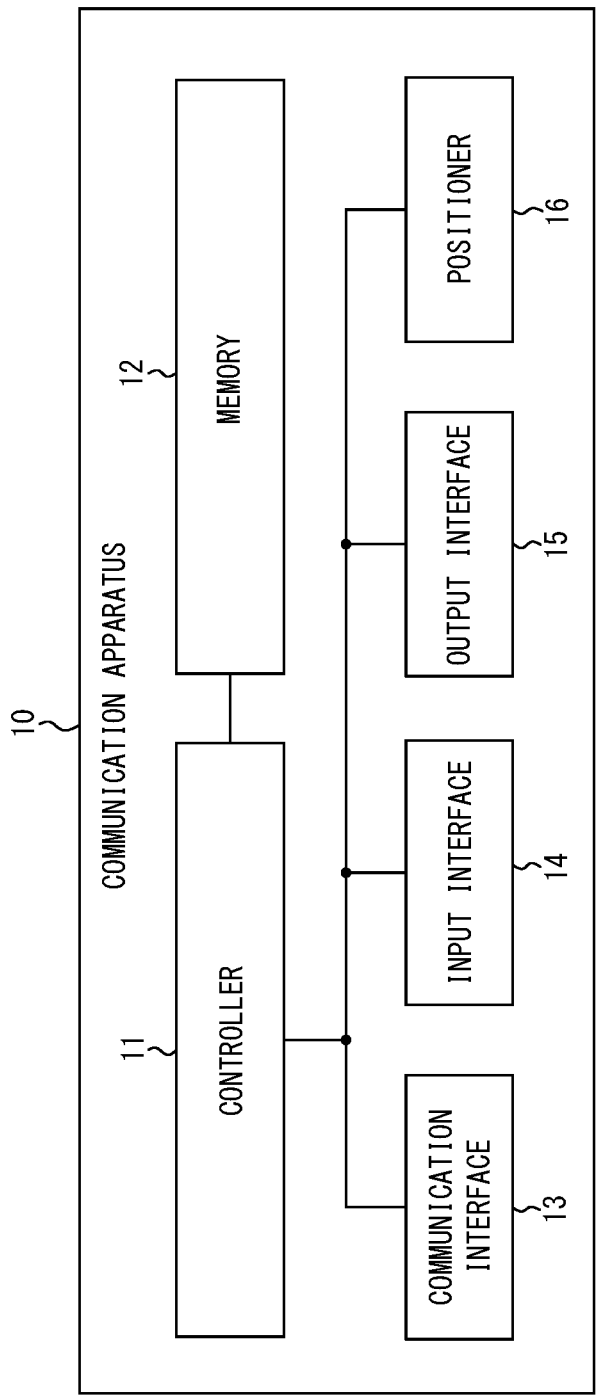
FIG. 2 is a block diagram illustrating a configuration of a communication apparatus according to an embodiment disclosed herein.

A configuration of the communication apparatus 10 according to the present embodiment will be described with reference to FIG. 2.

The communication apparatus 10 includes a controller 11, a memory 12, a communication interface 13, an input interface 14, an output interface 15, and a positioner 16.

The controller 11 includes at least one processor, at least one dedicated circuit, or a combination thereof. Examples of the processor include a general purpose processor such as a CPU or a GPU, and a dedicated processor dedicated to specific processing. "CPU" is an abbreviation of central processing unit. "GPU" is an abbreviation of graphics processing unit. Examples of the dedicated circuit include an FPGA and an ASIC. "FPGA" is an abbreviation of field-programmable gate array. "ASIC" is an abbreviation of application specific integrated circuit. The controller 11 executes processing related to the operation of the communication apparatus 10 while controlling each component of the communication apparatus 10.

The memory 12 includes at least one semiconductor memory, at least one magnetic memory, at least one optical memory, or a combination of at least two of these. Examples of the semiconductor memory include RAM and ROM. "RAM" is an abbreviation of random access memory. "ROM" is an abbreviation of read only memory. Examples of RAM include SRAM and DRAM. "SRAM" is an abbreviation of static random access memory. "DRAM" is an abbreviation of dynamic random access memory. An example of ROM includes EEPROM. "EEPROM" is an abbreviation of electrically erasable programmable read only memory. The memory 12 functions as, for example, a main memory, an auxiliary memory, or a cache memory. The memory 12 stores information for use in operations of the communication apparatus 10 and information resulting from operations of the communication apparatus 10.

The communication interface 13 includes at least one interface for communication. An example of the communication interface is a wireless communication interface that includes an omni-directional antenna, a wireless communication circuit, and the like. The communication interface 13 receives information for use in operations of the communication apparatus 10, or transmits information resulting from operations of the communication apparatus 10.

The input interface 14 includes at least one interface for input. Examples of the interface for input include a physical key, a capacitive key, a pointing device, a touch screen integrally provided with a display, or a microphone. The input interface 14 receives an operation for inputting information for use in operations of the communication apparatus 10. The input interface 14 may be connected to the communication apparatus 10 as an external input device, instead of being provided to the communication apparatus 10. The connection may be established through any communication means such as USB, HDMI® (HDMI is a registered trademark in Japan, other countries, or both), or Bluetooth® (Bluetooth is a registered trademark in Japan, other countries, or both). "USB" is an abbreviation of Universal Serial Bus. "HDMI®" is an abbreviation of High-Definition Multimedia Interface.

The output interface 15 includes at least one interface for output. Examples of the interface for output include a display and a speaker. Examples of the display include an LCD and an organic EL display. "LCD" is an abbreviation of liquid crystal display. "EL" is an abbreviation of electro luminescence. The output interface 15 outputs information acquired by the operation of the communication apparatus 10. The output interface 15 may be connected to the communication apparatus 10 as an external output device, instead of being provided in the communication apparatus 10. The connection may be established through any communication means such as USB, HDMI®, or Bluetooth®.

The positioner 16 includes at least one GNSS receiver. "GNSS" is an abbreviation of global navigation satellite system. Examples of GNSS include GPS, QZSS, GLONASS, and Galileo. "GPS" is an abbreviation of Global Positioning System. "QZSS" is an abbreviation of Quasi-Zenith Satellite System. The satellites for QZSS are known as quasi-zenith satellites. "GLONASS" is an abbreviation of Global Navigation Satellite System. The positioner 16 measures the position of the communication apparatus 10.

Functions of the communication apparatus 10 are implemented by execution of a communication program according to the present embodiment, by a processor corresponding to the controller 11. That is, the functions of the communication apparatus 10 are implemented by software. The communication program causes a computer to execute operations of the communication apparatus 30, to thereby cause the computer to function as the communication apparatus 10. In other words, the computer executes the operations of the communication apparatus 10 in accordance with the communication program, to thereby function as the communication apparatus 10.

The program may be stored on a non-temporary computer-readable medium. Examples of the non-transitory computer-readable medium include a magnetic recording device, an optical disk, a magneto-optical storage device, and ROM. The program is distributed by sale, transfer of ownership, or rental of a portable medium, such as a DVD or a CD-ROM, in which the program is stored. "DVD" is an abbreviation of digital versatile disc. "CD-ROM" is an abbreviation of compact disc read only memory. The program may be stored in storage in a server and distributed by transferring the program from the server to another computer. The program may be provided as a program product.

For example, the computer temporarily stores, in the main storage device, a program stored in a portable recording medium or a program transferred from a server. The computer then reads out, using a processor, the program stored in the main memory, and executes, by the processor, processing in accordance with the program thus read out. The computer may read out a program directly from the portable recording medium, and execute processing in accordance with the program. Each time a program is transferred from the server to the computer, the computer may sequentially execute processing in accordance with the received program. The processing may be executed through a so-called ASP-type service which implements functions merely by execution of instructions and acquisition of results, without transferring the program from the server to the computer. "ASP" is an abbreviation of application service provider. The programs include information that is to be used for processing by an electronic computer and is thus equivalent to a program. For example, data that is not a direct instruction to a computer but has properties that define the processing of the computer corresponds to "information equivalent to a program".

Some or all of the functions of the communication apparatus 10 may be implemented by a dedicated circuit corresponding to the controller 11. That is, part or all of the functions of the communication apparatus 10 may be implemented by hardware.

An example implementation of the communication apparatus 10 according to the present embodiment will be described with reference to FIG. 3.

Figure 3:
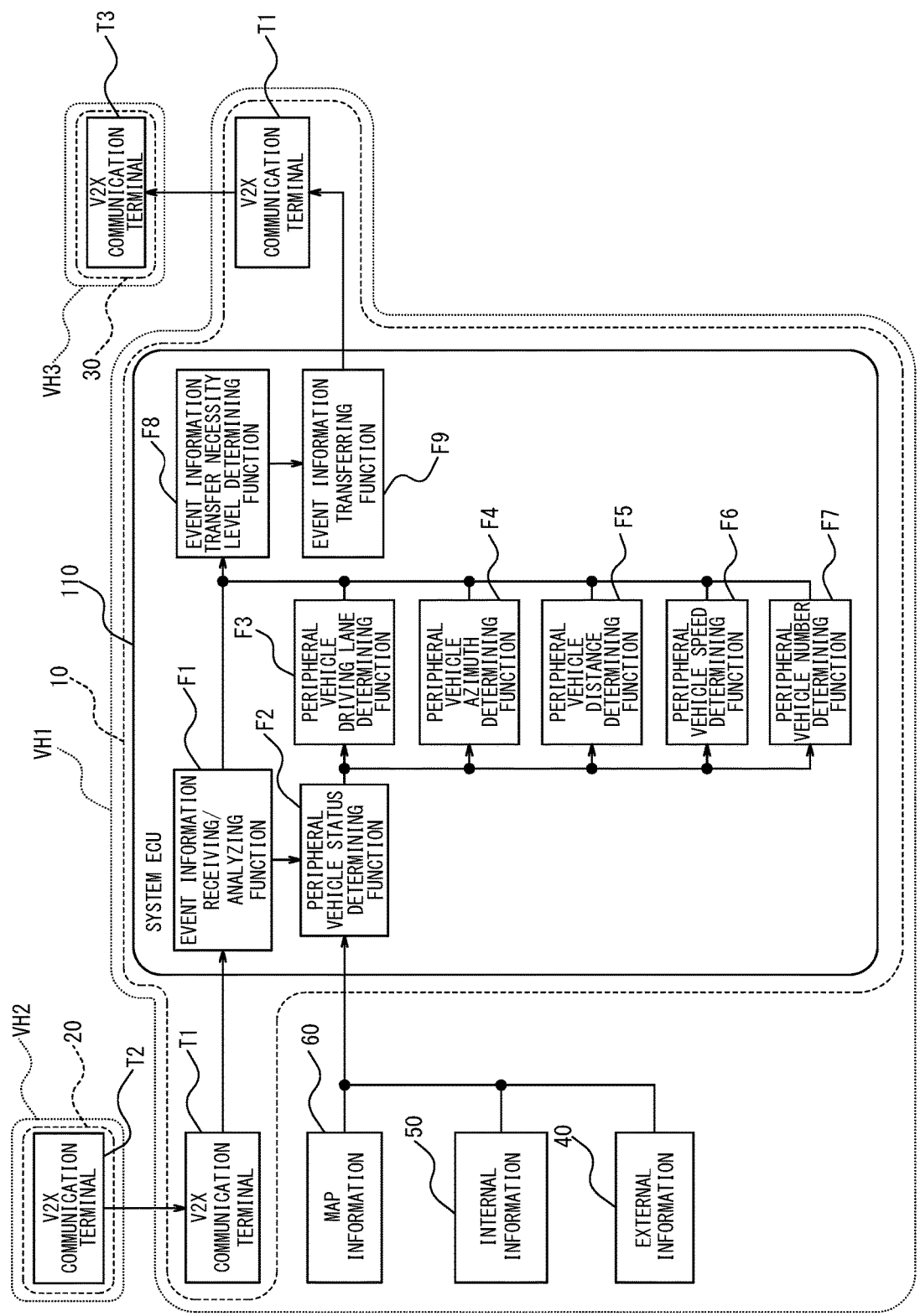
FIG. 3 is a block diagram illustrating an example implementation of a communication apparatus according to an embodiment disclosed herein.

In FIG. 3, the controller 11 and the memory 12 of the communication apparatus 10 according to the present embodiment are configured as a system ECU 110. "ECU" is an abbreviation of electronic control unit. The communication interface 13 of the communication apparatus 10 is configured as a V2X communication terminal T1. V2X is an abbreviation of vehicle-to-everything. V2X communication is a generic term encompassing inter-vehicle (V2V) communication and road-to-vehicle (V2I) communication. "V2V" is an abbreviation of vehicle-to-vehicle. "V2I" is an abbreviation of vehicle-to-infrastructure. The communication system to be used for V2X communication is, for example, DSRC or cellular V2X. "DSRC" is an abbreviation of Dedicated Short Range Communications. The positioner 16 of the communication apparatus 10 is configured as a GPS receiver.

The system ECU 110 of FIG. 3 has an event information receiving/analyzing function F1, a peripheral vehicle status determining function F2, a peripheral vehicle driving lane determining function F3, a peripheral vehicle azimuth determining function F4, a peripheral vehicle distance determining function F5, a peripheral vehicle speed determining function F6, a peripheral vehicle number determining function F7, an event information transfer necessity level determining function F8, and an event information transferring function F9. Each function of the system ECU 110 may be configured as a separate module or as a module integrated with one or more other functions.

The event information receiving/analyzing function F1 of the system ECU 110 uses event information transferred from the V2X communication terminal T1. An example of the event information transferred from the V2X communication terminal T1 is information that indicates event details, an event occurrence position, or an event occurrence lane. The peripheral vehicle status determining function F2 of the system ECU 110 uses map information 60, internal information 50, and external information 40. An example of the map information 60 is peripheral environment information such as the coordinates of intersections. The map information 60 may be stored in a memory or anywhere of the system ECU 110, the memory or anywhere corresponding to the memory 12 of the communication apparatus 10 according to the present embodiment, or may be stored in a database in a navigation device or other devices mounted on the first vehicle VH1. Examples of the internal information 50 include vehicle speed information, steering angle information, and front and rear gravitational acceleration information which is also known as front and rear G information. The internal information 50 may be, for example, signal information acquired from a CAN. "CAN" is an abbreviation of controller area network. The internal information 50 may further include GPS information acquired by a GPS receiver. Examples of the external information 40 include information that indicates the speed and the relative position information of the third vehicle VH3. The external information 40 may include information that indicates the number of the third vehicles VH3, and information that indicates the driving lanes of the third vehicles VH3. The external information 40 is acquired by, for example, an autonomous sensor. Examples of the autonomous sensor include a camera and a radar.

The configurations and functions of the communication apparatus 20 and the communication apparatus 30 according to the present embodiment are the same as those of the communication apparatus 10, and therefore description thereof is omitted.

In FIG. 3, the communication interface of the communication apparatus 20 according to the present embodiment is configured as V2X communication terminal T2. Similarly, the communication interface of the communication apparatus 30 is configured as V2X communication terminal T3.

Figure 4:
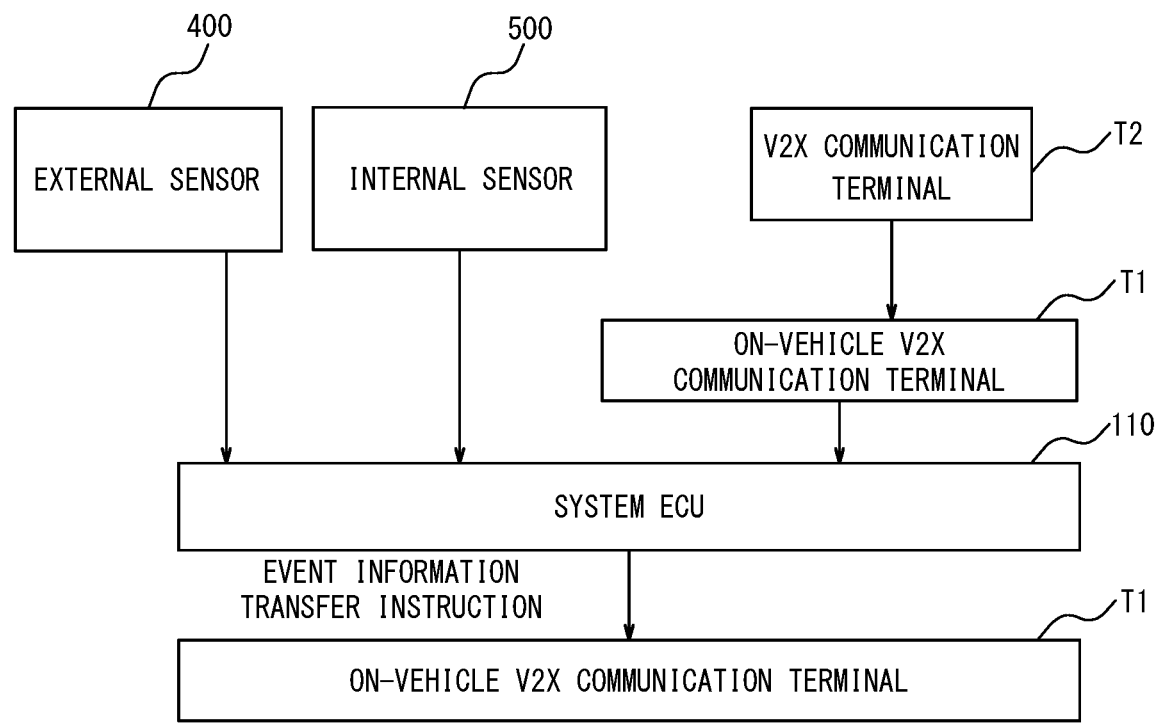
FIG. 4 is a diagram illustrating a flow of information in a communication apparatus according to an embodiment disclosed herein.

The flow of information in the example of FIG. 3 will be described with reference to FIG. 4.

The external sensor 400 is a sensor configured to detect the position and speed of a three-dimensional object. Examples of the external sensor 400 include an in-vehicle camera such as a front camera or a rear camera, a LiDAR, a millimeter-wave radar, a laser radar, or an ultrasonic sensor. "LiDAR" is an abbreviation of light detection and ranging. The external sensor 400 measures the peripheral status of the first vehicle VH1. The external sensor 400 detects, for example, the number of peripheral vehicles, and the peripheral vehicle position. The external sensor 400 corresponds to the autonomous sensor in the example of FIG. 3. The peripheral status may be measured using, for example, autonomous sensor information acquired from an autonomous sensor such as a camera or radar, or the vehicle-to-vehicle communication information of the previous cycle.

The internal sensor 500 is a sensor configured to detect information that indicates behavior of the first vehicle VH1 such as speed, steering, or generated deceleration of the first vehicle VH1, and the driver operation of the first vehicle VH1. The internal sensor 500 is, for example, a speed sensor, steering sensor, a G sensor, a camera, or radar. The internal sensor 500 acquires the aforementioned internal information 50 and the position information and attitude information of the first vehicle VH1. The internal sensor 500 corresponds to the various sensors and the GPS receiver connected to the CAN in the example of FIG. 3.

The V2X communication terminal T1 and the V2X communication terminal T2 receive and transfer event information. The V2X communication terminal T1 receives event information transmitted or transferred from the V2X communication terminal T2.

The system ECU 110 combines the information acquired by the internal sensor 500 with the information detected by the external sensor 400, to recognize the peripheral vehicle status. The system ECU 110 decides whether to perform transfer of the information, based on sensor information and communication-acquired information. The sensor information is information acquired by the external sensor 400 and the internal sensor 500. The communication-acquired information is event information transmitted from the V2X communication terminal T2. That is, the system ECU 110 decides whether to perform transfer of the event information, based on a peripheral vehicle status that has been recognized based on the information acquired by the internal sensor 500 and the information acquired by the external sensor 400, and the event information transmitted from the communication apparatus 20. When the system ECU 110 has decided that the transfer is necessary, the system ECU 110 gives an instruction to transfer event information to the V2X communication terminal T2. In response to the instruction of transferring the event information, the event information is transferred from the V2X communication terminal T1.

The operation of the communication apparatus 10 according to the present embodiment will be described with reference to FIGS. 5 to 13. The operation corresponds to a communication method according to the present embodiment.

Figure 5:
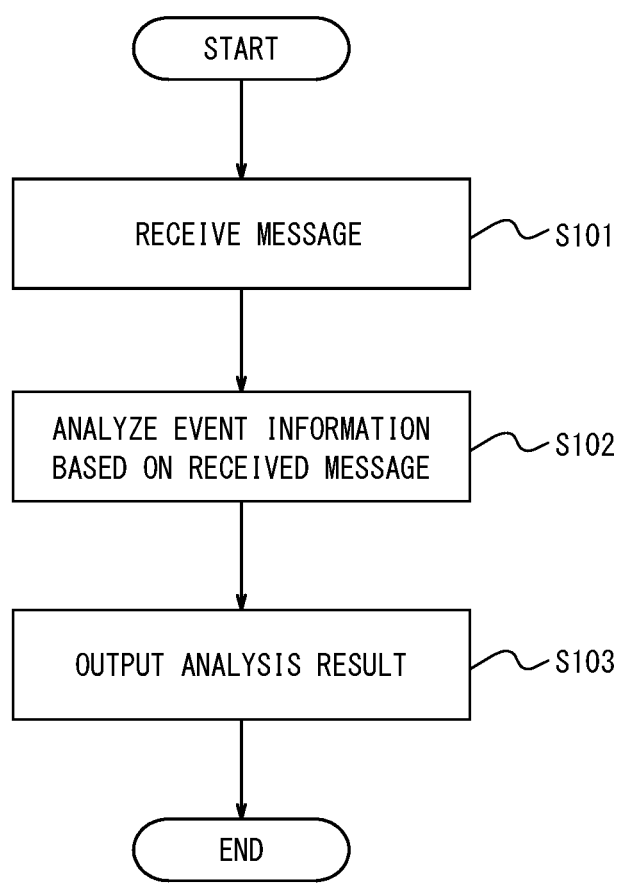
FIG. 5 is a flowchart illustrating a process to be executed by a controller of a communication apparatus according to an embodiment disclosed herein.

The controller 11 of the communication apparatus 10 according to the present embodiment receives, using the event information receiving/analyzing function F1, event information via the communication interface 13 of the communication apparatus 10. FIG. 5 illustrates a processing flow by the event information receiving/analyzing function F1 of the controller 11.

In Step S101, the controller 11 receives the event information transferred from the communication apparatus 20. In the present embodiment, DENM is received as the event information. In Step S102, the controller 11 analyzes the received event information. The analysis of the event information includes identifying, for example, an event occurrence position, an event rate, an azimuth of the event position, a lane number of the event position, and the like, from DENM.

In Step S103, the controller 11 outputs an analysis result of the event information. Examples of the analysis result include an event occurrence position, an event rate, an azimuth of the event position, a lane number of the event position, and the like specified from the event information. Items to be output as the analysis result of event information are set appropriately according to the data dictionary of the communication standard. The controller 11 stores the analysis result in the memory 12.

When the event information is received, the controller 11 of the communication apparatus 10 according to the present embodiment recognizes, using the peripheral vehicle status determining function F2, the peripheral status of the first vehicle VH1, and outputs the specified peripheral status as peripheral vehicle status information. The controller 11 stores the peripheral vehicle status information in the memory 12.

Figure 6:
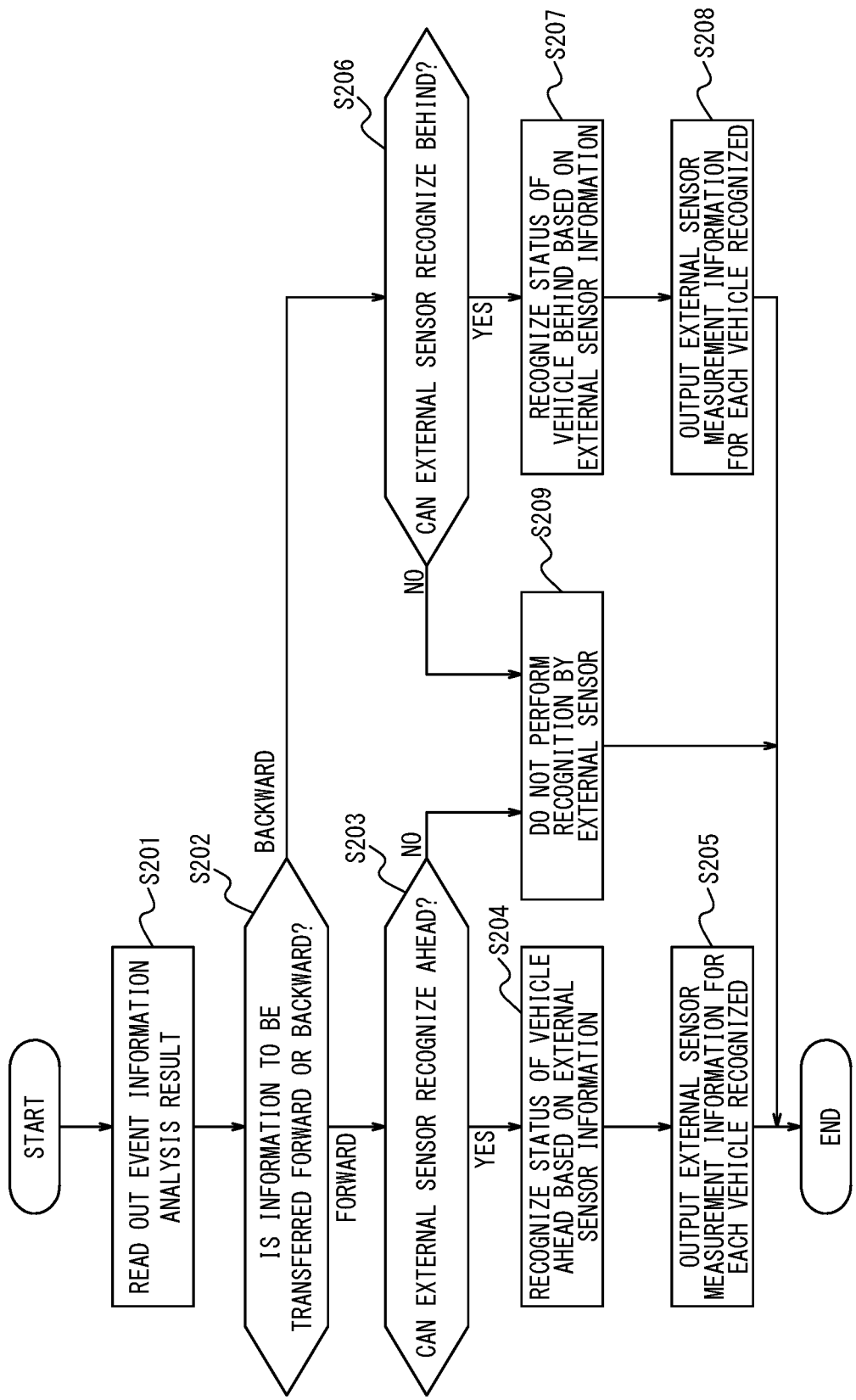
FIG. 6 is a flowchart illustrating a process to be executed by a controller of a communication apparatus according to an embodiment disclosed herein.

FIG. 6 illustrates a processing flow by the peripheral vehicle status determining function F2 of the controller 11.

In Step S201, the controller 11 reads out the analysis result of the event information from the memory 12. In Step S202, the controller 11 decides whether the event information needs to be transferred forward or backward. When the event occurrence position indicated by the event information is behind in the traveling direction of the first vehicle VH1, the controller 11 decides that the information needs to be transferred forward. On the other hand, when the event occurrence position is ahead in the traveling direction of the first vehicle VH1, the controller 11 decides that the event-occurrence position needs to be transferred backward. The direction in which the event information is to be transferred may be set in advance according to the relationship between the event detail indicated by the event information and the event occurrence position. For example, when the event detail is emergency braking and the event occurrence position is ahead in the traveling direction of the first vehicle VH1, the transfer direction of the event information is set as backward. When the event detail is approach of an emergency vehicle and the event occurrence position is behind the traveling direction of the first vehicle VH1, the transfer direction of the event information is set as forward.

When it is decided in Step S202 that the event information needs to be transferred forward, the process of Step S203 is executed. In Step S203, the controller 11 determines whether the external sensor 400 can recognize a front view. When the external sensor 400 can recognize a front view, the process of Step S204 is executed. In Step S204, the controller 11 recognizes, based on the external information 40 acquired by the external sensor 400, the status of a vehicle ahead of the first vehicle VH1, and determines whether any vehicle can be identified ahead of the first vehicle VH1. In Step S205, the controller 11 outputs, for each vehicle identified, information that indicates the measurement result obtained by the external sensor 400. Examples of the information that indicates the measurement result include information that indicates speed and relative position of a peripheral vehicle. The controller 11 stores, in the memory 12, information that indicates the measurement result obtained by the external sensor 400, as peripheral vehicle status information.

On the other hand, when it is decided in Step S202 that the information needs to be transferred backward, the process of Step S206 is executed. In Step S206, the controller 11 determines whether the external sensor 400 can recognize a rear view. When it is determined that the external sensor 400 can recognize a rear view, the process of Step S207 and the process of Step S208 are executed. The process of Step S207 and the process of Step S208 are the same as those of Step S204 and Step S205, except that the processes are executed for the status of a vehicle behind the first vehicle VH1.

When it is determined in Step S203 or Step S206 that the recognition by the external sensor 400 is not possible, the process of Step S209 is executed. In Step S209, the controller 11 terminates the process without performing the recognition by the external sensor 400. Examples of cases in which the recognition by the external sensor 400 is not possible include poor visibility or failure of an autonomous sensor as the external sensor 400.

The controller 11 of the communication apparatus 10 according to the present embodiment calculates, for each of the recognized peripheral vehicles, the driving lane, azimuth, distance, speed, and the number, based on the peripheral vehicle situation information, and outputs the result of the calculation as the peripheral vehicle information. The controller 11 determines the driving lane using the peripheral vehicle driving lane determining function F3. The controller 11 determines the azimuth, using the peripheral vehicle orientation determining function F4. The controller 11 determines the distance, using the peripheral vehicle distance determining function F5. The controller 11 determines the speed, using the peripheral vehicle speed determining function F6. The controller 11 determines the number of the peripheral vehicles, using the peripheral vehicle number determining function F7.

Figure 7:
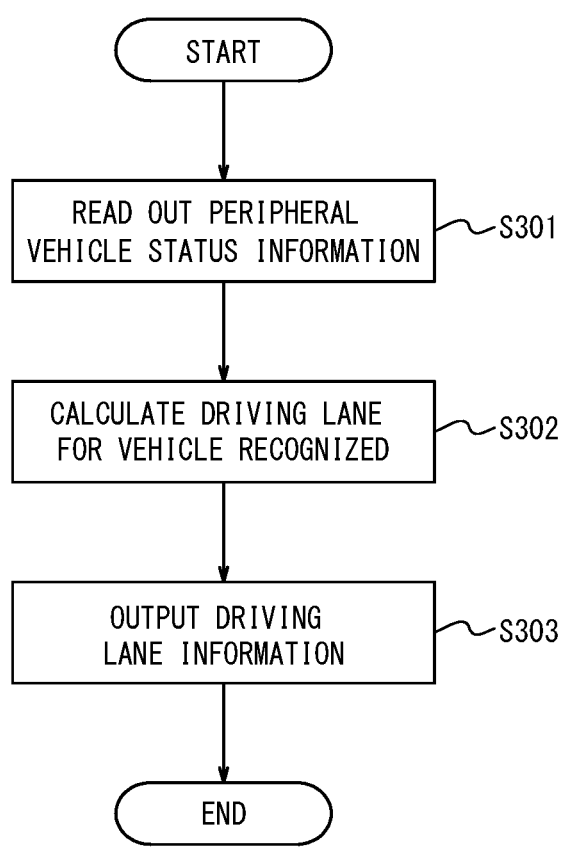
FIG. 7 is a flowchart illustrating a process to be executed by a controller of a communication apparatus according to an embodiment disclosed herein.

FIG. 7 illustrates a processing flow by the peripheral vehicle driving lane determining function F3 of the controller 11.

In Step S301, the controller 11 reads out the peripheral vehicle status information from the memory 12. In Step S302, the controller 11 calculates the driving lane for each recognized vehicle, based on the peripheral vehicle status information. In Step S303, the controller 11 outputs information that indicates the calculated driving lane. The controller 11 stores information that indicates the driving lane as the driving lane information in the memory 12.

Figure 8:
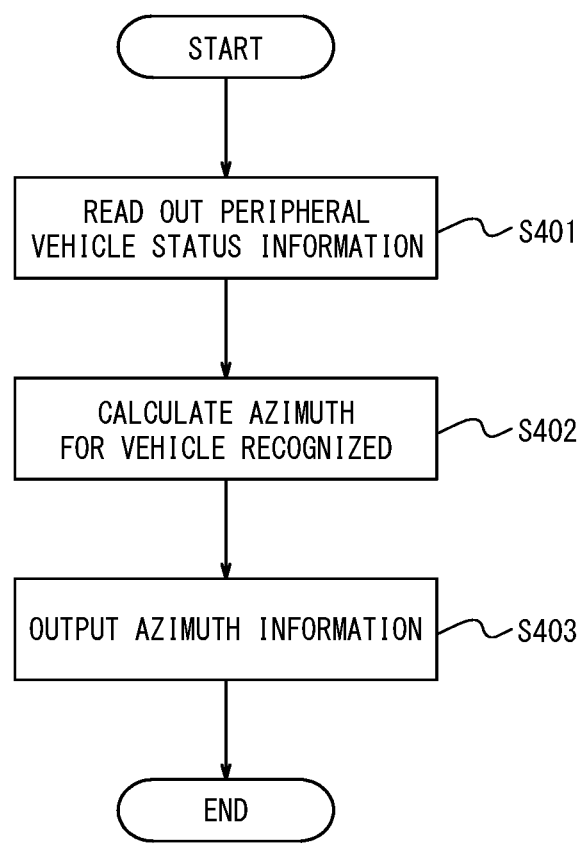
FIG. 8 is a flowchart illustrating a process to be executed by a controller of a communication apparatus according to an embodiment disclosed herein.

FIG. 8 illustrates a processing flow by the peripheral vehicle orientation determining function F4 of the controller 11.

In Step S401, the controller 11 reads out the peripheral vehicle status information from the memory 12. In Step S402, the controller 11 calculates the azimuth of each vehicle recognized, based on the peripheral vehicle status information. In Step S403, the controller 11 outputs information that indicates the calculated azimuth. The controller 11 stores information that indicates the azimuth as azimuth information in the memory 12.

Figure 9:
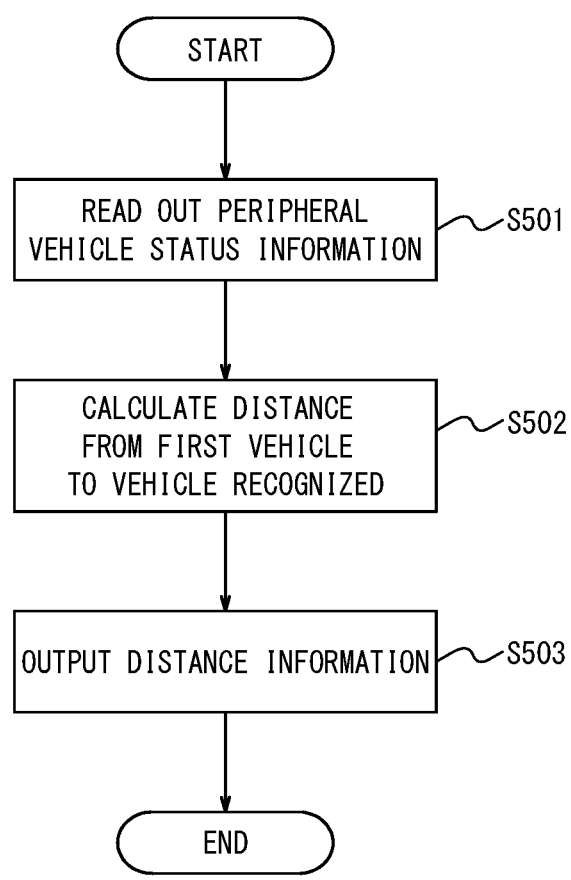
FIG. 9 is a flowchart illustrating a process to be executed by a controller of a communication apparatus according to an embodiment disclosed herein.

FIG. 9 illustrates a processing flow by the peripheral vehicle distance determining function F5 of the controller 11.

In Step S501, the controller 11 reads out the peripheral vehicle status information from the memory 12. In Step S502, the controller 11 calculates the distance from the first vehicle VH1 for each vehicle recognized, based on the peripheral vehicle status information. In Step S503, the controller 11 outputs information that indicates the calculated distance. The controller 11 stores information that indicates the distance as distance information in the memory 12.

Figure 10:
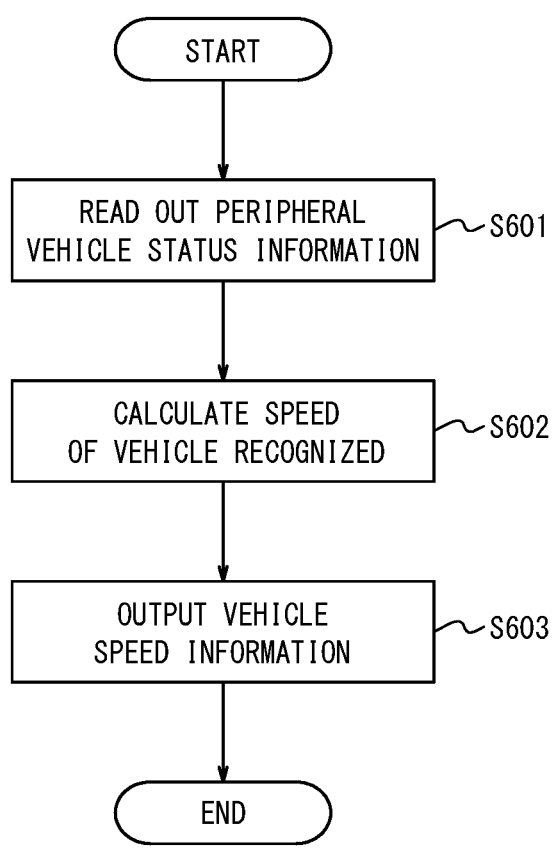
FIG. 10 is a flowchart illustrating a process to be executed by a controller of a communication apparatus according to an embodiment disclosed herein.

FIG. 10 illustrates a processing flow by the peripheral vehicle speed determining function F6 of the controller 11.

In Step S601, the controller 11 reads out the peripheral vehicle status information from the memory 12. In Step S602, the controller 11 calculates the speed for each vehicle recognized, based on the peripheral vehicle status information. In Step S603, the controller 11 outputs information that indicates the calculated speed. The controller 11 stores information that indicates the speed in the memory 12 as vehicle speed information.

Figure 11:
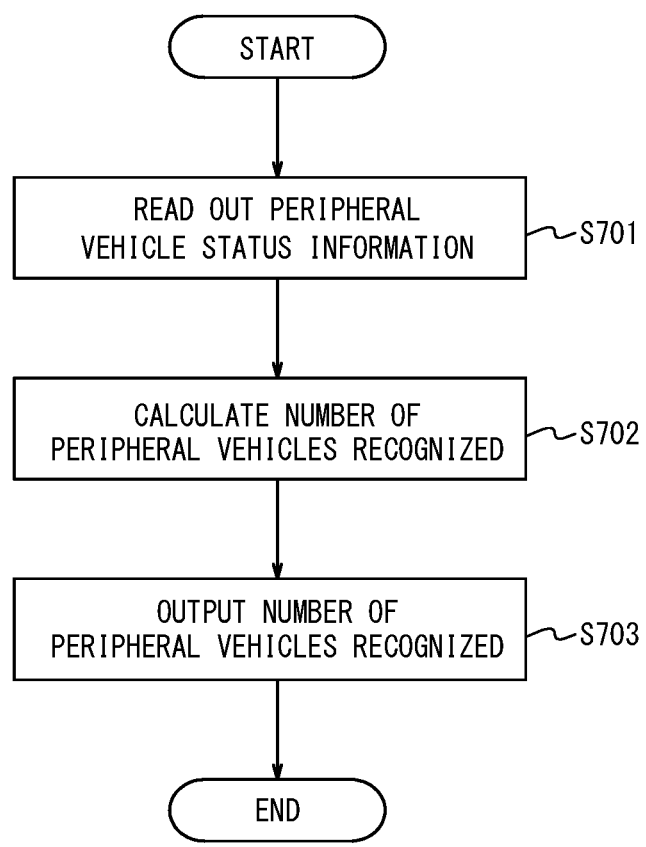
FIG. 11 is a flowchart illustrating a process to be executed by a controller of a communication apparatus according to an embodiment disclosed herein.

FIG. 11 illustrates a processing flow by the peripheral vehicle number determining function F7 of the controller 11.

In Step S701, the controller 11 reads out the peripheral vehicle status information from the memory 12. In Step S702, the controller 11 calculates the number of recognized vehicles, based on the peripheral vehicle status information. In Step S703, the controller 11 outputs information that indicates the calculated number of vehicles. The controller 11 stores information that indicates the number of vehicles as the vehicle number information in the memory 12.

The controller 11 of the communication apparatus 10 according to the present embodiment decides whether to perform transfer of the event information, based on the analysis result of the event information and the peripheral vehicle information. The controller 11 decides, using the event information transfer necessity level determining function F8, whether to perform transfer of the event information.

Figure 12:
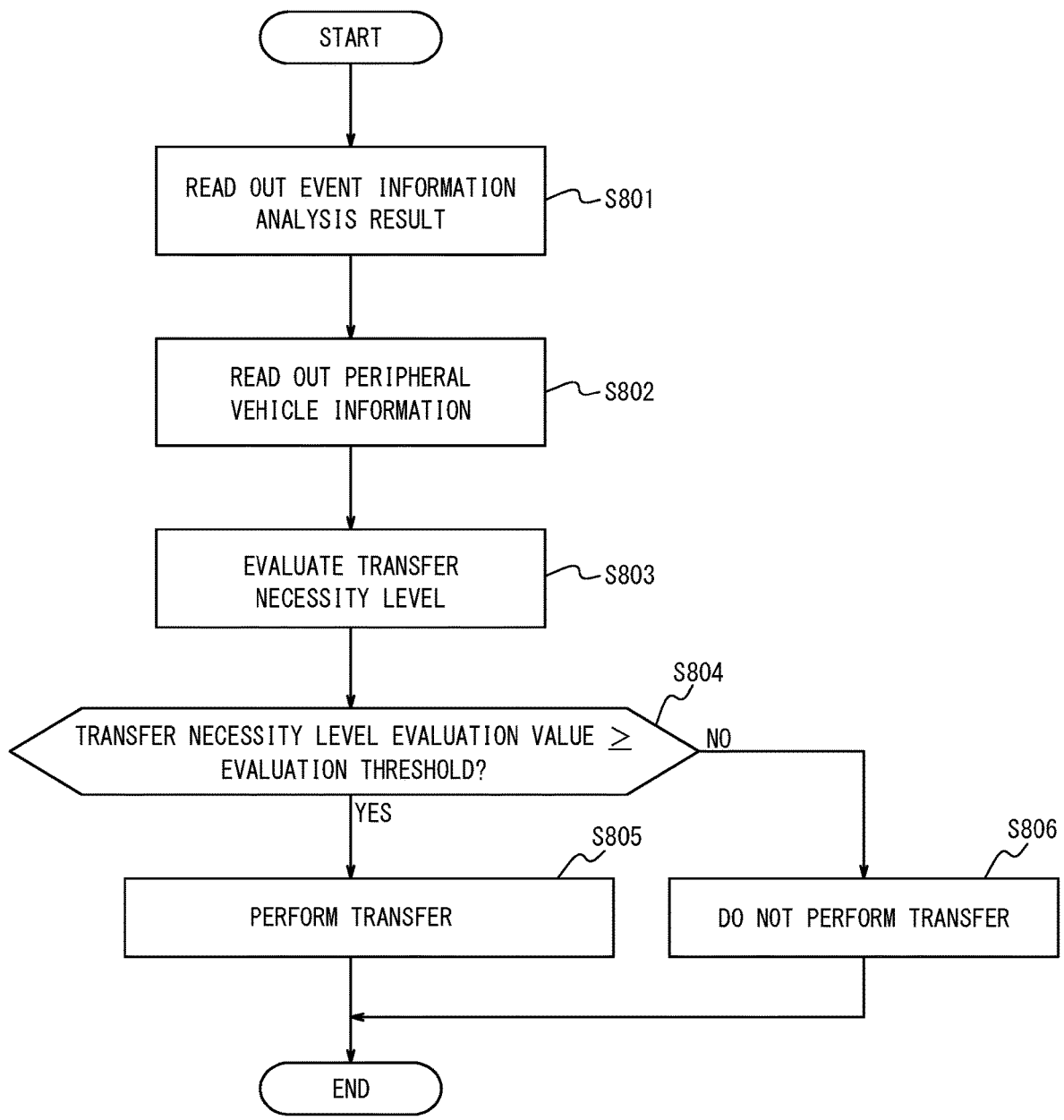
FIG. 12 is a flowchart illustrating a process to be executed by a controller of a communication apparatus according to an embodiment disclosed herein.

FIG. 12 illustrates a processing flow by the event information transfer necessity level determining function F8 of the controller 11.

In Step S801, the controller 11 reads out the analysis result of the event information from the memory 12. In Step S802, the controller 11 reads out, from the memory 12, the driving lane information, the azimuth information, the distance information, the vehicle speed information, and the vehicle number information of the peripheral vehicle as peripheral vehicle information. In Step S803, the controller 11 evaluates the necessity level for transfer of the event information based on the analysis result of the event information and the peripheral vehicle information. The controller 11 calculates the evaluation of the necessity level for transferring the event information as a transfer necessity level evaluation value.

In Step S804, the controller 11 compares the transfer necessity level evaluation value obtained in Step S803 with a preset evaluation threshold. When the transfer necessity level evaluation value is equal to or greater than the evaluation threshold, the process of Step S805 is executed. In Step S805, the controller 11 decides to cause the communication interface 13 to perform transfer, and stores the result of the decision in the memory 12 as the event information transfer necessity level determination result. On the other hand, when the transfer necessity level evaluation value is not equal to or greater than the evaluation threshold, the process of Step S806 is executed. The controller 11 decides not to cause the communication interface 13 to perform transfer, and stores the result of the decision in the memory 12 as the event information transfer necessity level determination result.

The controller 11 of the communication apparatus 10 according to the present embodiment instructs the communication interface 13 as to whether to transmit event information, based on the event information transfer necessity level determination result. The instruction is performed using the event information transferring function F9 of the controller 11.

Figure 13:
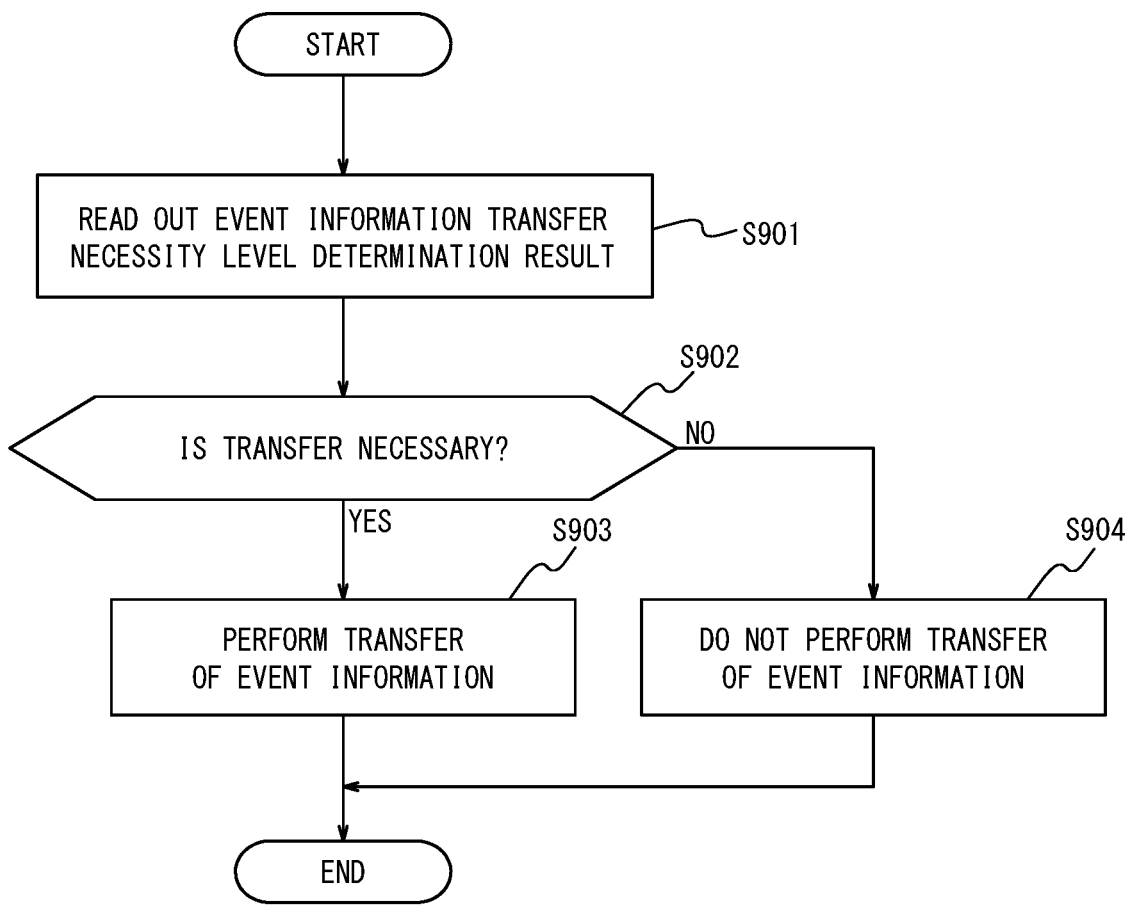
FIG. 13 is a flowchart illustrating a process to be executed by a controller of a communication apparatus according to an embodiment disclosed herein.

FIG. 13 illustrates a processing flow by the event information transferring function F9 of the controller 11.

In Step S901, the controller 11 reads out, from the memory 12, the event information transfer necessity level determination result. When it is determined that the decision result is to perform the transfer in Step S902, the process of Step S903 is executed. In Step S903, the controller 11 instructs the communication interface 13 to perform transfer of event information. That is, when the determination result indicates to perform transfer in Step S902, the controller 11 gives an information transfer instruction to the communication interface 13, and event information is transferred from the communication interface 13. On the other hand, when the determination result indicates not to perform transfer in Step S902, the process of Step S904 is executed. In Step S904, the controller 11 does not instruct the communication interface 13 to perform transfer of event information. That is, the controller 11 does not give an information transfer instruction to the communication interface 13, and event information is not transferred from the communication interface 13.

As described above, in the present embodiment, the communication interface 13 of the communication apparatus 10 mounted on the first vehicle VH1 performs wireless communication with a communication apparatus mounted on a vehicle other than the first vehicle VH1, and when the event information which indicates the occurrence of an event and is transferred from the communication apparatus 20 mounted on the second vehicle VH2 different from the first vehicle VH1 is received by the communication interface 13, the controller 11 of the communication apparatus 10 determines the status of the third vehicle VH3 different from the first vehicle VH1 and the second vehicle VH2, based on the result of the determination, to decide whether to cause the communication interface 13 to perform transfer of the event information to the communication apparatus 30 mounted on the communication interface 13.

According to the present embodiment, it is possible to reduce the transfer of information that is unnecessary for a driver of a vehicle that is an information transfer target. According to the present embodiment, necessary information can be transferred within an appropriate range, which can solve problems of traffic congestion, and an increase in the load on the vehicle control apparatus.

Specific examples of the communication apparatus 10 according to the present embodiment will be described with reference to FIGS. 14 to 18. These specific examples are not for limiting the present disclosure, but are to help in understanding of the present embodiment. For convenience, the first threshold is X [m], the second threshold is Y [m], the third threshold is Z [km/h], and the evaluating threshold is 5 [points] in the examples of FIGS. 14 to 18.

Figure 14:
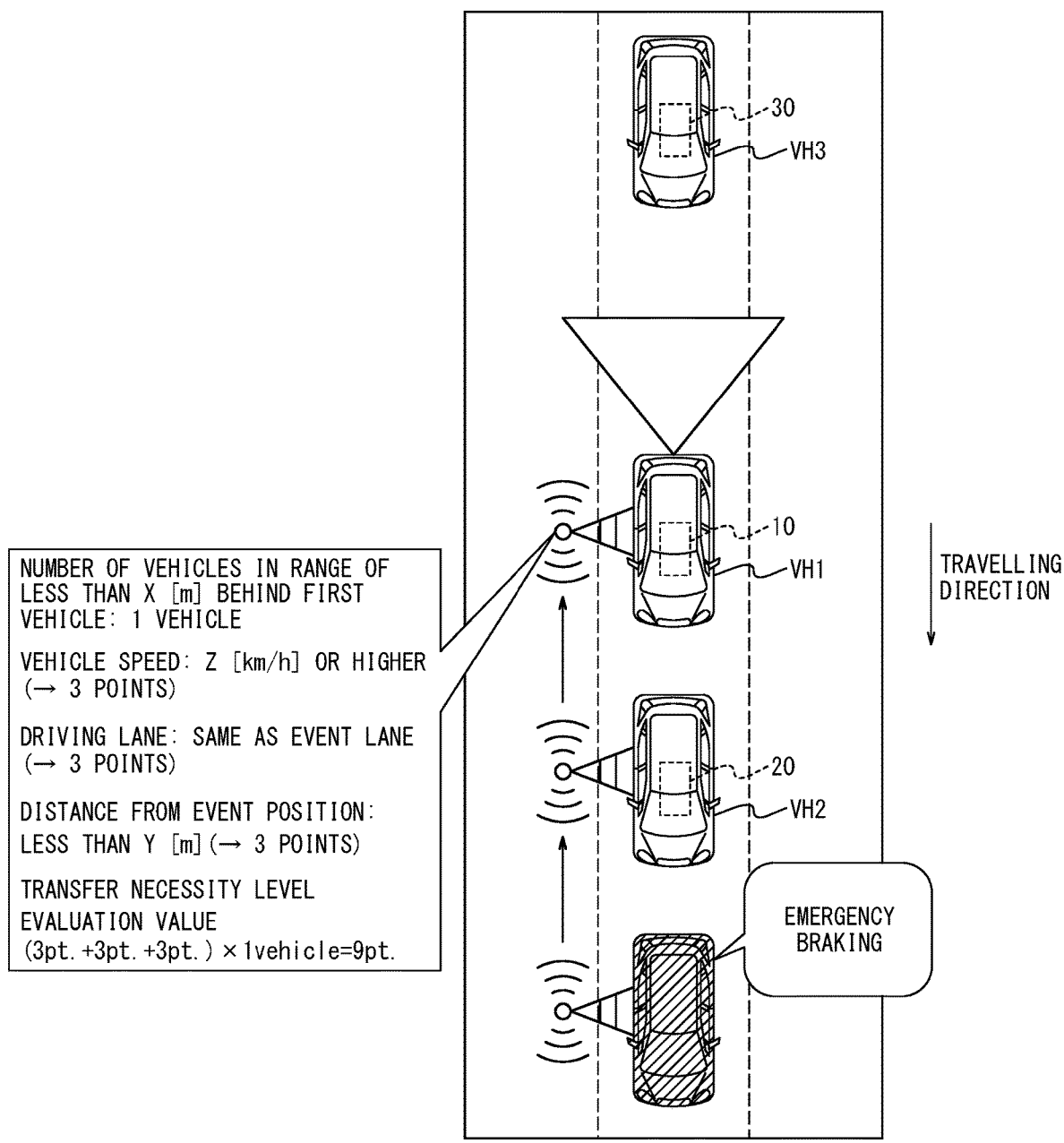
FIG. 14 is a diagram illustrating a communication system according to an embodiment disclosed herein, in which the event is emergency braking.

FIG. 14 illustrates an example of a method for calculating transfer necessity level evaluation value by the communication apparatus 10 according to the present embodiment.

In this example, the event is emergency braking. NPTL 1 provides a specification of an RHS application, in which a use case for an emergency electronic brake light is defined. "RHS" is an abbreviation of Road Hazard Signaling.

In this example, emergency brake operation information is transmitted as the event information, from a vehicle applying emergency braking, to the communication apparatus 20 of the second vehicle VH2. The communication apparatus 20 of the second vehicle VH2 receives the emergency brake operation information, and transfers the received emergency brake operation information as the event information to the communication apparatus 10 of the first vehicle VH1.

When the event occurrence position indicated by the information included in the event information is ahead in the traveling direction of the first vehicle VH1, the controller 11 of the communication apparatus 10 recognizes, as the third vehicle VH3, a vehicle behind in the traveling direction of the first vehicle VH1. Specifically, the event of emergency braking has occurred ahead in the traveling direction of the first vehicle VH1, and thus the controller 11 recognizes, as the third vehicle VH3, a vehicle behind in the traveling direction of the first vehicle VH1. In this example, the communication apparatus 10 of the first vehicle VH1 confirms the situation behind with an autonomous sensor such as a rear camera, and the controller 11 recognizes, as the third vehicle VH3, a vehicle behind the first vehicle VH1. In this example, the third vehicle VH3 thus recognized is driving in the same lane as the event occurrence lane.

The controller 11 determines the status of the third vehicle VH3.

The determination of the status of the third vehicle VH3 by the controller 11 includes determining whether the first distance from the first vehicle VH1 to the third vehicle VH3 is less than the first threshold. In this example, the third vehicle VH3 is found in a range of less than X [m] behind the first vehicle VH1, and thus the controller 11 determines that the first distance from the first vehicle VH1 to the third vehicle VH3 is less than the first threshold.

The controller 11 determines as follows the status of the third vehicle VH3 for which the first distance is determined as being less than the first threshold, in terms of speed, driving lane, and second distance from the occurrence position of the event to the third vehicle VH3.

The determination of the status of the third vehicle VH3 by the controller 11 includes determining whether the speed of the third vehicle VH3 is equal to or greater than the third threshold. In this example, the speed of the third vehicle VH3 is equal to or greater than Z [km/h], and thus the controller 11 determines that the speed of the third vehicle VH3 is equal to or greater than the third threshold. Based on the result of the determination, the controller 11 evaluates the necessity level for transfer, and decides whether to cause the communication interface 13 to perform transfer according to the necessity level. When the event occurrence position is ahead in the traveling direction of the first vehicle VH1, the controller 11 evaluates the necessity level for transfer as being higher than that in a case in which the speed of the third vehicle VH3 behind in the traveling direction of the first vehicle VH1 is determined as being equal to or greater than the third threshold, than that in a case in which the speed of the third vehicle VH3 is determined as not being equal to or greater than the third threshold. In this example, the event occurrence position is ahead in the traveling direction of the first vehicle VH1 and the speed of the third vehicle VH3 behind in the traveling direction of the first vehicle VH1 is determined as being equal to or greater than the third threshold, and thus the controller 11 adds 3 [points].

The determination of the status of the third vehicle VH3 by the controller 11 includes comparing the event lane in which an event indicated by the information included in the event information has occurred, with the driving lane in which the third vehicle VH3 is traveling. In this example, the controller 11 compares the driving lane of the third vehicle VH3 with the event lane. The controller 11 evaluates the necessity level for transfer based on the result of the determination, and decides whether to cause the communication interface 13 to perform transfer, according to the necessity level. When the controller 11 has determined, as a result of comparing the event lane with the driving lane, that the event lane is the same as the driving lane, the controller 11 evaluates the necessity level as being higher than in a case in which the event lane has determined as not being the same as the driving lane. In this example, the controller 11 compares the driving lane of the third vehicle VH3 with the event lane to determine that the lanes are the same, and adds 3 [points].

The determination of the status of the third vehicle VH3 by the controller 11 includes determining whether the second distance from the event occurrence position to the third vehicle VH3 is less than the second threshold. In this example, the distance from the event occurrence position to the third vehicle VH3 is less than Y [m], and thus the controller 11 determines that the second distance from the occurrence position of the event to the third vehicle VH3 is less than the second threshold. When the occurrence position of the event is ahead in the traveling direction of the first vehicle VH1, the controller 11 recognizes, as the third vehicle VH3, a vehicle behind in the traveling direction of the first vehicle VH1. The controller 11 evaluates the necessity level for transfer based on the result of the determination, and determines whether to cause the communication interface 13 is to perform the transfer according to the necessity level. The controller 11 evaluates, when the second distance from the first vehicle VH1 to the third vehicle VH3 is determined as being less than the second threshold, the necessity level for transfer as being higher than that in a case in which the second distance from the first vehicle VH1 to the third vehicle VH3 is determined as not being less than the second threshold. In this example, the event occurrence position is ahead in the traveling direction of the first vehicle VH1 and the second distance from the first vehicle VH1 to the third vehicle VH3 behind in the traveling direction of the first vehicle VH1 is determined as being less than the second threshold, and thus the controller 11 adds 3 [points].

The controller 11 evaluates the necessity level for transfer based on the determination of the status of the third vehicle VH3. In this example, the controller 11 sums up: 3 [points] obtained as the result of determining the speed as the status of the third vehicle VH3; 3 [points] obtained as the result of determining the driving lane as the status of the third vehicle VH3; and 3 [points] obtained as the result of determining the second distance as the status of the third vehicle VH3, and multiplies by "1", which is the number of vehicles found in a range in which the first distance is less than the first threshold, to thereby obtain the transfer necessity level evaluation value as 9 [points]. The evaluation threshold is 5 [points], and thus the controller 11 determines that the transfer necessity level evaluation value is equal to or greater than the evaluation threshold.

In this example, when two or more vehicles are found in a range in which the first distance is less than the first threshold, the controller 11 determines the status for each vehicle. When some of the vehicles share in common the same status determination result, the transfer necessity level evaluation value is calculated by multiplying the sum of the determination results for each vehicle by the number of vehicles sharing in common the same status determination result. More specifically, when there is another vehicle other than the third vehicle VH3, and the result of determining the status of the vehicle is the same as the result of determining the status of the third vehicle VH3, the transfer necessity level evaluation value is determined as 18 [points] by multiplying 9 [points], which is the total value of the determination result of the third vehicle VH3, by "2". On the other hand, when the result of determining the status of each vehicle is different, the total of the sums of the determination results for vehicles is obtained as the transfer necessity level evaluation value. Specifically, when the result of determining the speed of the other vehicle is 3 [points], the result of determining the driving lane is 1 [point], and the result of determining the second distance is 1 [point], the transfer necessity level evaluation value is determined as 14 [points], which is the total of 9 [points] which is the sum of the determination results of the third vehicle VH3 and 5 [points] which is the sum of the determination results of the other vehicle.

The controller 11 determines whether to cause the communication interface 13 to perform transfer according to the necessity level. Specifically, when the transfer necessity level evaluation value is equal to or greater than the evaluation threshold, the controller 11 decides to cause the communication interface 13 to perform transfer of information. In this example, the transfer necessity level evaluation value is determined as being equal to or greater than the evaluation threshold, and the controller 11 decides to cause the communication interface 13 to perform transfer of information.

That is, in this example, the necessity level for transfer is determined as being equal to or greater than the evaluation threshold, based on the speed status, driving lane status, and distance status of the third vehicle VH3, with the result that the controller 11 decides that the transfer of information is necessary, and transfer is performed.

As described above, in this example, the necessity level for transferring event information is suitably determined.

Figure 15:
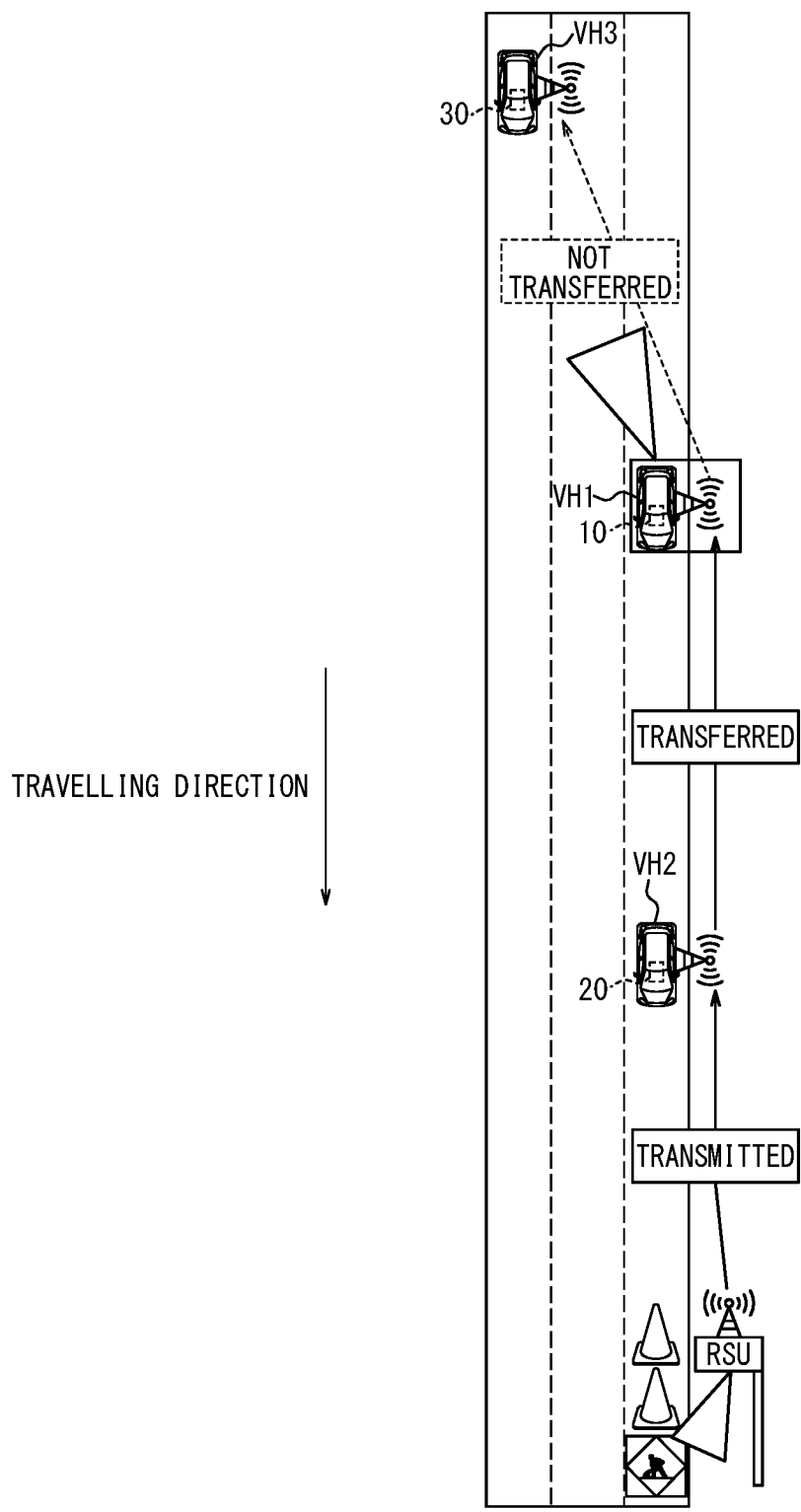
FIG. 15 is a diagram illustrating a communication system according to an embodiment disclosed herein, in which the event is road works.

FIG. 15 illustrates an example of a method for calculating transfer necessity level evaluation value by the communication apparatus 10 according to the present embodiment.

In this example, the event is road works. Road works is a use case defined in the RHS application provided by NPTL 1.

In the use case of road works, the transfer of event information may likely to lead to an unnecessary warning. Illustrated below is a specific example for suitably determining, by the communication apparatus 10 according to the present embodiment, the necessity level for transfer, to thereby reduce unnecessary operations.

In this example, the road work information as the event information is transmitted from an RSU, which is an example of a communication terminal in an infrastructure, to the communication apparatus 20 of the second vehicle VH2. "RSU" is an abbreviation of roadside unit. The communication apparatus 20 of the second vehicle VH2 receives the road work information, and transfers the received road work information as the event information to the communication apparatus 10 of the first vehicle VH1.

When the occurrence position of the event indicated by the information included in the event information is ahead in the traveling direction of the first vehicle VH1, the controller 11 of the communication apparatus 10 recognizes, as the third vehicle VH3, a vehicle behind in the traveling direction of the first vehicle VH1. Specifically, the event of road work has occurred ahead in the traveling direction of the first vehicle VH1, and thus the controller 11 recognizes, as the third vehicle VH3, a vehicle behind in the traveling direction of the first vehicle VH1. In this example, the communication apparatus 10 of the first vehicle VH1 checks the status behind the first vehicle VH1 with an autonomous sensor such as a rear camera, and the controller 11 recognizes, as the third vehicle VH3, a vehicle behind the first vehicle VH1.

In this example, the third vehicle VH3, which is a vehicle behind the first vehicle VH1, is traveling in a lane different from the lane in which the road work event has occurred, and the second distance which is the distance from the event occurrence position to the third vehicle VH3 is sufficiently large. In this case, even if the event information is transferred, the driver of the third vehicle VH3 may rather feel annoyed without seeing the need for the information.

The controller 11 determines the status of the third vehicle VH3 in the same manner as illustrated in FIG. 14.

The determination of the status of the third vehicle VH3 by the controller 11 includes determining whether the first distance from the first vehicle VH1 to the third vehicle VH3 is less than the first threshold. This example assumes that the third vehicle VH3 is found in a range of less than X [m] behind the first vehicle VH1. The controller 11 determines that the first distance from the first vehicle VH1 to the third vehicle VH3 is less than the first threshold.

The controller 11 determines as follows the status of the third vehicle VH3 for which the first distance is determined as being less than the first threshold, in terms of speed, driving lane, and second distance from the occurrence position of the event to the third vehicle VH3.

The determination of the status of the third vehicle VH3 by the controller 11 includes comparing the event lane with the driving lane in which the third vehicle VH3 is traveling. In this example, the controller 11 compares the driving lane of the third vehicle VH3 with the event lane. When it is determined, as a result of comparing the event lane with the driving lane, that the event lane and the driving lane are the same, the controller 11 evaluates the necessity level as being higher than that in a case in which the event lane and the driving lane are determined as not being the same. In this example, as a result of comparing the driving lane of the third vehicle VH3 with the event lane, the controller 11 determines that the event lane is different from, that is, not the same as, the driving lane of the third vehicle VH3, and adds 0 [point].

The determination of the condition of the third vehicle VH3 by the controller 11 includes determining whether the second distance from the occurrence position of the event to the third vehicle VH3 is less than the second threshold. This example assumes that the second distance is Y [m] or more. The controller 11 determines that the second distance is equal to or greater than the second threshold.

When the occurrence position of the event is ahead in the traveling direction of the first vehicle VH1, the controller 11 recognizes, as the third vehicle VH3, a vehicle behind in the traveling direction of the first vehicle VH1. When the second distance from the first vehicle VH1 to the third vehicle VH3 is determined as being less than the second threshold, the controller 11 evaluates the necessity level for transfer as being higher than that in a case in which the second distance from the first vehicle VH1 to the third vehicle VH3 is determined as not being less than the second threshold. In this example, the event occurrence position is ahead in the traveling direction of the first vehicle VH1, and the second distance from the first vehicle VH1 to the third vehicle VH3 behind in the traveling direction of the first vehicle VH1 is determined as being equal to or greater than the second threshold. Thus, the controller 11 adds 0 [points].

The controller 11 also determines the speed of the third vehicle VH3 in the same manner as in the example shown in FIG. 14. This example assumes that the speed of the third vehicle VH3 is Z [km/h] or more. The controller 11 determines that the speed is equal to or greater than the third threshold. Thus, the controller 11 adds 3 [points].

The controller 11 evaluates the necessity level for transfer based on the determination of the status of the third vehicle VH3. The evaluation of the necessity level for transfer is performed in the same manner as in the example shown in FIG. 14. In this example, the controller 11 sums up: 0 [points] obtained as the result of determining the driving lane as the status of the third vehicle VH3; 0 [points] obtained as the result of determining the second distance as the status of the third vehicle VH3, and 3 [points] obtained as the result of determining the vehicle speed as the status of the third vehicle VH3, and multiplies by "1", which is the number of vehicles found in a range in which the first distance is less than the first threshold, to thereby obtain the transfer necessity level evaluation value as 3 [points]. The evaluation threshold is 5 [points], and thus the controller 11 determines that the transfer necessity level evaluation value is less than the evaluation threshold.

The controller 11 decides whether to cause the communication interface 13 to perform transfer according to the necessity. Specifically, when the transfer necessity level evaluation value is less than the evaluation threshold, the controller 11 decides not to cause the communication interface 13 to perform transfer of information. In this example, the transfer necessity level evaluation value is determined as being less than the evaluation threshold, and thus the controller 11 decides not to cause the communication interface 13 to perform transfer of information.

That is, in this embodiment, the distance from the event occurrence position to the third vehicle VH3 is sufficiently large, and the driving lane in which the event has occurred is different from the driving lane in which the third vehicle VH3 is travelling. Thus, the transfer is not performed.

Thus, in this example, based on the driving lane status in which the driving lane of the event occurrence position and the driving lane of the vehicle behind are separated from each by one lane and the distance status in which the position of the vehicle behind is sufficiently away from the event occurrence position, the evaluation function evaluates the necessity level for transfer of the information as being low and determines the necessity level as being equal to or less than the evaluation threshold, and thus the transfer is not performed.

In this example, the necessity level for transfer is suitably determined, and thus annoyance that would be felt by the driver is reduced.

Figure 16:
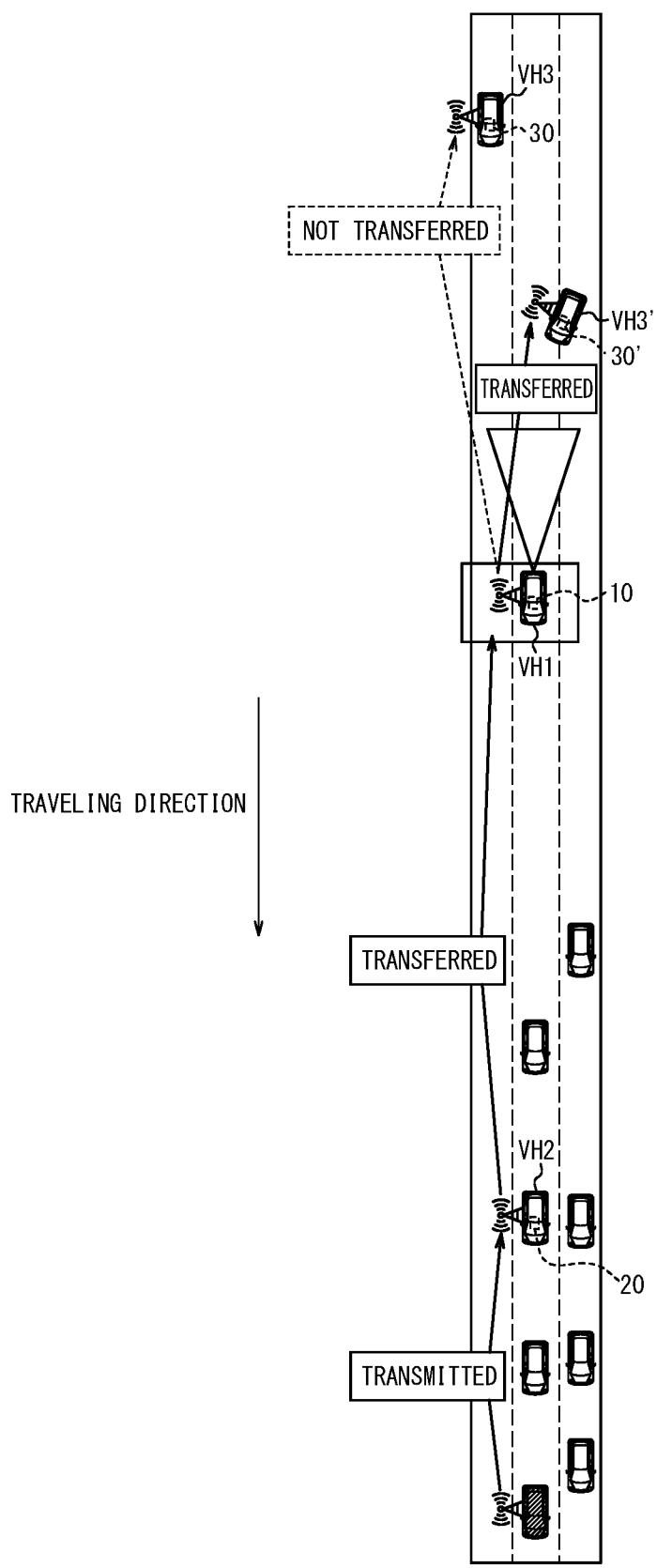
FIG. 16 is a diagram illustrating a communication system according to an embodiment disclosed herein, in which the event is emergency braking.

FIG. 16 illustrates an example of a transfer necessity level evaluation value calculation method performed by the communication apparatus 10 according to the present embodiment.

In this example, the event is emergency braking.

In the use case for the emergency brake light of NPTL 1, an unnecessary warning operation may be likely to occur due to the transfer of the event information. Illustrated below are two cases in which the communication apparatus 10 according to the present embodiment suitably determines the necessity level for transfer.

In FIG. 16, two vehicles that include the third vehicle VH3 and the third vehicle VH3' are illustrated. Illustrated below is a case in which information is to be transferred to the third vehicle VH3'. This example assumes that only the third vehicle VH3' exists and the third vehicle VH3 does not exist. Meanwhile, also illustrated is a case in which information is not to be transferred to the third vehicle VH3. This example assumes that only the third vehicle VH3 exists while the third vehicle VH3' does not exist.

In this example, the emergency brake operation information is transmitted as the event information, from a vehicle applying emergency braking, to the communication apparatus 20 of the second vehicle VH2. The communication apparatus 20 of the second vehicle VH2 receives the emergency brake operation information, and transfers the received emergency brake operation information as the event information to the communication apparatus 10 of the first vehicle VH1.

When the occurrence position of the event indicated by the information included in the event information is ahead in the traveling direction of the first vehicle VH1, the controller 11 of the communication apparatus 10 recognizes, as the third vehicle VH3 or the third vehicle VH3', a vehicle behind in the traveling direction of the first vehicle VH1. Specifically, the event of the emergency braking has occurred ahead in the traveling direction of the first vehicle VH1, the controller 11 recognizes, as the third vehicle VH3 or as the third vehicle VH3', a vehicle behind in the traveling direction of the first vehicle VH1. In this example, the event of emergency braking has occurred ahead in the traveling direction of the first vehicle VH1, the communication apparatus 10 of the first vehicle VH1 checks the status behind of the first vehicle VH1 with an autonomous sensor such as a rear camera, and recognizes, as the third vehicle VH3 or the third vehicle VH3', a vehicle behind in the traveling direction of the first vehicle VH1.

In this example, a case of performing transfer is explained by taking the third vehicle VH3' as an example. In FIG. 16, the third vehicle VH3' behind in the traveling direction of the first vehicle VH1 has moved into the same lane as the event occurrence lane. The driver of the third vehicle VH3' is concentrating on the lane changing operation, and thus the reaction speed may be delayed when sudden braking occurs ahead.

The controller 11 determines the status of the third vehicle VH3' in the same manner as illustrated in FIG. 14.

The determination of the status of the third vehicle VH3' by the controller 11 includes determining whether the first distance from the first vehicle VH1 to the third vehicle VH3' is less than the first threshold. This example assumes that the third vehicle VH3' is found in a range of less than X [m] behind the first vehicle VH1. The controller 11 determines that the first distance from the first vehicle VH1 to the third vehicle VH3' is less than the first threshold.

The controller 11 determines as follows the status of the third vehicle VH3' for which the first distance is determined as being less than the first threshold, in terms of speed, driving lane, and second distance from the occurrence position of the event to the third vehicle VH3.

The determination of the status of the third vehicle VH3' by the controller 11 includes comparing the event lane with the driving lane in which the third vehicle VH3' is traveling. When the driver of the third vehicle VH3' performs an operation for changing lane from a first lane to a second lane different from the first lane, the controller 11 compares the second lane as the driving lane with the event lane. In this example, the driver of the third vehicle VH3' is performing the lane change operation, and the controller 11 compares the center lane, which is the second lane, as the driving lane of the third vehicle VH3', with the event lane. The operation for changing lanes by the driver is detected, for example, by detecting, with the external sensor 400, blinking of the blinker of the third vehicle VH3'.

When it is determined, as a result of comparing the event lane with the driving lane, that the event lane is the same as the driving lane, the controller 11 evaluates the necessity level for transfer as being higher than that in a case in which the event lane is determined as not being the same as the driving lane. In this example, the controller 11 compares the center lane as the driving lane of the third vehicle VH3' with the event lane to determine that the lanes are the same, and adds 3 [points].

The controller 11 also determines the speed and the second distance for the third vehicle VH3' in the same manner as in the example illustrated in FIG. 14. This example assumes that the speed is Z [km/h] or more and the second distance is Y [m] or more. The controller 11 determines that the speed is equal to or greater than the third threshold, and adds 3 [points]. The controller 11 determines that the second distance is equal to or greater than the second threshold, and adds 0 [point].

The controller 11 evaluates the necessity level for transfer based on the determination of the status of the third vehicle VH3'. The evaluation of the necessity level for transfer is performed in the same manner as in the example illustrated in FIG. 14. In this example, the controller 11 sums up: 3 [points] obtained as a result of determining the driving lane as the status of the third vehicle VH3'; with 3 [points] obtained as the result of determining the speed as the status of the third vehicle VH3'; and 0 [point] as the result of determining the second distance as the status of the third vehicle VH3', and multiplies by "1", which is the number of vehicles found in a range in which the first distance is less than the first threshold, to thereby obtain the transfer necessity level evaluation value as 6 [points]. The evaluation threshold is 5 [points], and thus the controller 11 determines that the transfer necessity level evaluation value is equal to or greater than the evaluation threshold.

The controller 11 decides whether to cause the communication interface 13 to perform the transfer according to the necessity level. Specifically, when the transfer necessity level evaluation value is equal to or greater than the evaluation threshold, the controller 11 decides to cause the communication interface 13 to perform transfer of information. In this example, the transfer necessity level evaluation value is determined as being equal to or greater than the evaluation threshold, the controller 11 decides to cause the communication interface 13 to perform transfer of information.

According to the lane status and the driver operation status, the controller 11 evaluates the necessity level for transferring information as being equal to or greater than a threshold, and the transfer is performed.

In this example, a case of not performing transfer is explained by taking the third vehicle VH3' as an example. In FIG. 16, the third vehicle VH3 behind in the traveling direction of the first vehicle VH1 is traveling in a lane different from the event occurrence lane, and the distance from the event occurrence position to the third vehicle VH3 is sufficiently large. In this case, even if event information is transferred, the driver of the third vehicle VH3 may rather feel annoyed without seeing the need for the information. Further, this case assumes no other vehicle found behind other than the third vehicle VH3, or no other vehicle found for which transfer of information is likely to be needed.

The controller 11 determines the status of the third vehicle VH3 in the same manner as illustrated in FIG. 14.

The determination of the status of the third vehicle VH3 by the controller 11 includes determining whether the first distance from the first vehicle VH1 to the third vehicle VH3 is less than the first threshold. This example assumes that the third vehicle VH3 is found in a range of less than X [m] behind the first vehicle VH1. The controller 11 determines that the first distance from the first vehicle VH1 to the third vehicle VH3 is less than the first threshold.

The controller 11 determines as follows the status of the third vehicle VH3 for which the first distance is determined as being less than the first threshold, in terms of speed, driving lane, and second distance from the occurrence position of the event to the third vehicle VH3.

The determination of the status of the third vehicle VH3 by the controller 11 includes comparing the event lane with the driving lane in which the third vehicle VH3 is traveling. In this example, the controller 11 compares the driving lane of the third vehicle VH3 with the event lane. When it is determined, as a result of comparing the event lane with the driving lane, that the event lane is the same as the driving lane, the controller 11 evaluates the necessity as being higher than that in a case in which the event lane is determined as not being the same as the driving lane. In this embodiment, as a result of comparing the driving lane of the third vehicle VH3 with the event lane, the controller 11 determines that the event lane is differed from, that is, not the same as, the driving lane of the third vehicle VH3, and adds 0 [point].

The determination of the status of the third vehicle VH3 by the controller 11 includes determining whether the second distance from the occurrence position of the event to the third vehicle VH3 is less than a second threshold. This example assumes that the second distance is Y [m] or more. The controller 11 determines that the second distance is equal to or greater than the second threshold.

When the occurrence position of the event is ahead in the traveling direction of the first vehicle VH1, the controller 11 recognizes, as the third vehicle VH3, a vehicle behind in the traveling direction of the first vehicle VH1. When the second distance from the first vehicle VH1 to the third vehicle VH3 is determined as being less than the second threshold, the controller 11 evaluates the necessity level for transfer as being higher than in a case in which the second distance from the first vehicle VH1 to the third vehicle VH3 is determined as not being less than the second threshold. In this example, the event occurrence position is ahead in the traveling direction of the first vehicle VH1, and the second distance from the first vehicle VH1 to the third vehicle VH3 behind in the traveling direction of the first vehicle VH1 is determined as being equal to or greater than the second threshold. Thus, the controller 11 adds 0 [point].

The controller 11 also determines the speed of the third vehicle VH3 in the same manner as in the example illustrated in FIG. 14. This example assumes that the speed of the third vehicle VH3 is Z [km/h] or more. The controller 11 determines that the speed is equal to or greater than the third threshold, and adds 3 [points].

The controller 11 evaluates the necessity level for transfer based on the result of determining the status of the third vehicle VH3. The evaluation of the necessity level for transfer is performed in the same manner as in the example illustrated in FIG. 14. In this example, the controller 11 sums up: 0 [point] obtained as the result of determining the driving lane as the status of the third vehicle VH3; 3 [points] obtained as the result of determining the speed as the status of the third vehicle VH3 and 0 [point] obtained as the result of determining the second distance as the status of the third vehicle VH3, and multiplies by "1", which is the number of vehicles in a range in which the first distance is less than the first threshold, to thereby obtain the transfer necessity level evaluation value as 3 [points]. The evaluation threshold is 5

[points], and thus the controller 11 determines that the transfer necessity level evaluation value is less than the evaluation threshold.

The controller 11 decides whether to cause the communication interface 13 to perform the transfer in accordance with the necessity level. Specifically, when the transfer necessity level evaluation value is less than the evaluation threshold, the controller 11 decides not to cause the communication interface 13 to perform transfer of information. In this example, the transfer necessity level evaluation value is determined as being less than the evaluation threshold, and thus the controller 11 decides not to cause the communication interface 13 to perform transfer of information.

That is, in this example, the distance to the event occurrence position is sufficiently large and the driving lanes are different from each other, and thus the transfer is not performed. Thus, annoyance to be felt by the driver is reduced.

Figure 17:
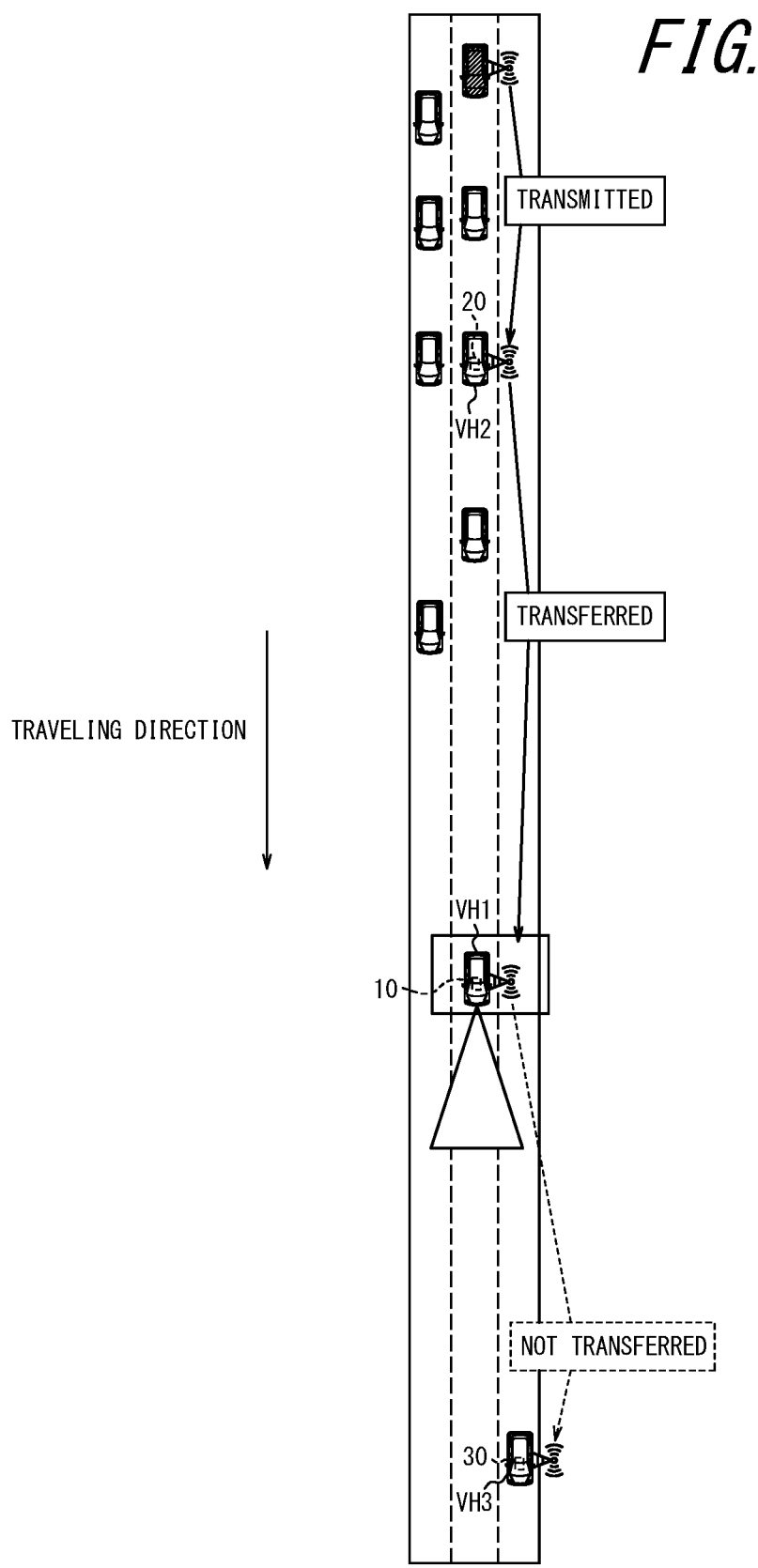
FIG. 17 is a diagram illustrating a communication system according to an embodiment disclosed herein, in which the event is approach of an emergency vehicle.

FIG. 17 illustrates an example of a transfer necessity level evaluation value calculation method by the communication apparatus 10 according to the present embodiment.

In this example, the event is approach of an emergency vehicle. The approach of an emergency vehicle is a use case defined in the RHS application provided by NPTL 1.

In the use case of an approach of an emergency vehicle, the transfer of event information may likely to lead to an unnecessary warning. Illustrated below is a specific example for suitably determining, by the communication apparatus 10 according to the present embodiment, the necessity level for transfer, to thereby reduce unnecessary operations.

In this example, emergency vehicle approach information as the event information is transmitted from the emergency vehicle to the communication apparatus 20 of the second vehicle VH2. The communication apparatus 20 of the second vehicle VH2 receives the emergency vehicle approach information, and transfers the received emergency vehicle approach information to the communication apparatus 10 of the first vehicle VH1.

When the occurrence position of the event indicated by the information included in the event information is behind in the traveling direction of the first vehicle VH1, the controller 11 of the communication apparatus 10 recognizes, as the third vehicle VH3, a vehicle ahead in the traveling direction of the first vehicle VH1. Specifically, the event of the emergency vehicle approach has occurred behind in the traveling direction of the first vehicle VH1, and thus the controller 11 recognizes, as the third vehicle VH3, a vehicle ahead in the traveling direction of the first vehicle VH1. In this example, the communication apparatus 10 of the first vehicle VH1 checks the situation ahead with an autonomous sensor such as a front camera, and the controller 11 recognizes, as the third vehicle VH3, a vehicle ahead of the first vehicle VH1. This example assumes that the speed of the third vehicle VH3 is Z [km/h] or more.

The controller 11 determines the status of the third vehicle VH3 in the same manner as illustrated in FIG. 14.

The determination of the status of the third vehicle VH3 by the controller 11 includes determining whether the first distance from the first vehicle VH1 to the third vehicle VH3 is less than the first threshold. This example assumes that the third vehicle VH3 is found in a range of less than X [m] ahead the first vehicle VH1. The controller 11 determines that the first distance from the first vehicle VH1 to the third vehicle VH3 is less than the first threshold.

The controller 11 determines as follows the status of the third vehicle VH3 for which the first distance is determined as being less than the first threshold, in terms of speed, driving lane, a second distance from the generation position of the event to the third vehicle VH3.

The determination of the status of the third vehicle VH3 by the controller 11 includes determining whether the speed of the third vehicle VH3 is equal to or greater than a third threshold. In this embodiment, the speed of the third vehicle VH3 is equal to or greater than Z [km/h], and thus the controller 11 determines that the speed of the third vehicle VH3 is equal to or greater than the third threshold. When the event occurrence position is behind in the traveling direction of the first vehicle VH1, the controller 11, evaluates the necessity level for transfer as being lower in a case in which the speed of the third vehicle VH3 ahead in the traveling direction of the first vehicle VH1 is equal to or greater than the third threshold, than in a case in which the speed of the third vehicle VH3 ahead in the traveling direction of the first vehicle VH1 is not equal to or greater than the third threshold. In this example, the event occurrence position is behind in the traveling direction of the first vehicle VH1, and the speed of the third vehicle VH3 ahead in the traveling direction of the first vehicle VH1 is determined as being equal to or greater than the third threshold. Thus, the controller 11 adds 0 [point].

The controller 11 determines the driving lane and the second distance for the third vehicle VH3 in the same manner as the example illustrated in FIG. 14. In this example, the third vehicle VH3 is traveling in a driving lane that is different from the event lane, and the second distance is assumed to be less than Y [m]. The controller 11 determines that the driving lane and the event lane are not the same, and adds 0 [point]. The controller 11 determines that the second distance is less than the second threshold, and adds 3 [points].

The controller 11 evaluates the necessity level for transfer based on the determination of the status of the third vehicle VH3. The evaluation of the necessity level for transfer is performed in the same manner as in the example illustrated in FIG. 14. In this example, the controller 11 sums up: 0 [point] obtained as the result of determining the driving lane as the status of the third vehicle VH3; 0 [point] obtained as the result of determining the speed as the status of the third vehicle VH3; and 3 [points] obtained as the result of determining the second distance as the status of the third vehicle VH3, and multiplies by "1", which is the number of vehicles in a range in which the first distance is less than the first threshold, to thereby obtain the transfer necessity level evaluation value as 3 [points]. The evaluation threshold is 5 [points], and thus the controller 11 determines that the transfer necessity level evaluation value is less than the evaluation threshold.

The controller 11 decides whether to cause the communication interface 13 to perform the transfer in accordance with the necessity level. Specifically, when the transfer necessity level evaluation value is less than the evaluation threshold, the controller 11 decides not to cause the communication interface 13 to perform transfer of information. In this example, the transfer necessity level evaluation value is determined as being less than the evaluation threshold, and thus the controller 11 decides not to cause the communication interface 13 to perform transfer of information.

That is, in this example, based on the driving lane status in which the event occurrence position and the driving lane position of the vehicle ahead are different from each other and the vehicle speed status in which the speed of the third vehicle VH3 is equal to or greater than the third threshold, the controller 11 evaluates the necessity level for transferring information as being low, and the necessity level is determined as being equal to or lower than the evaluation threshold, and the transfer is not performed.

As described above, in this example, the necessity level for transfer is suitably determined, and thus annoyance to be felt by the driver is reduced.

Figure 18:
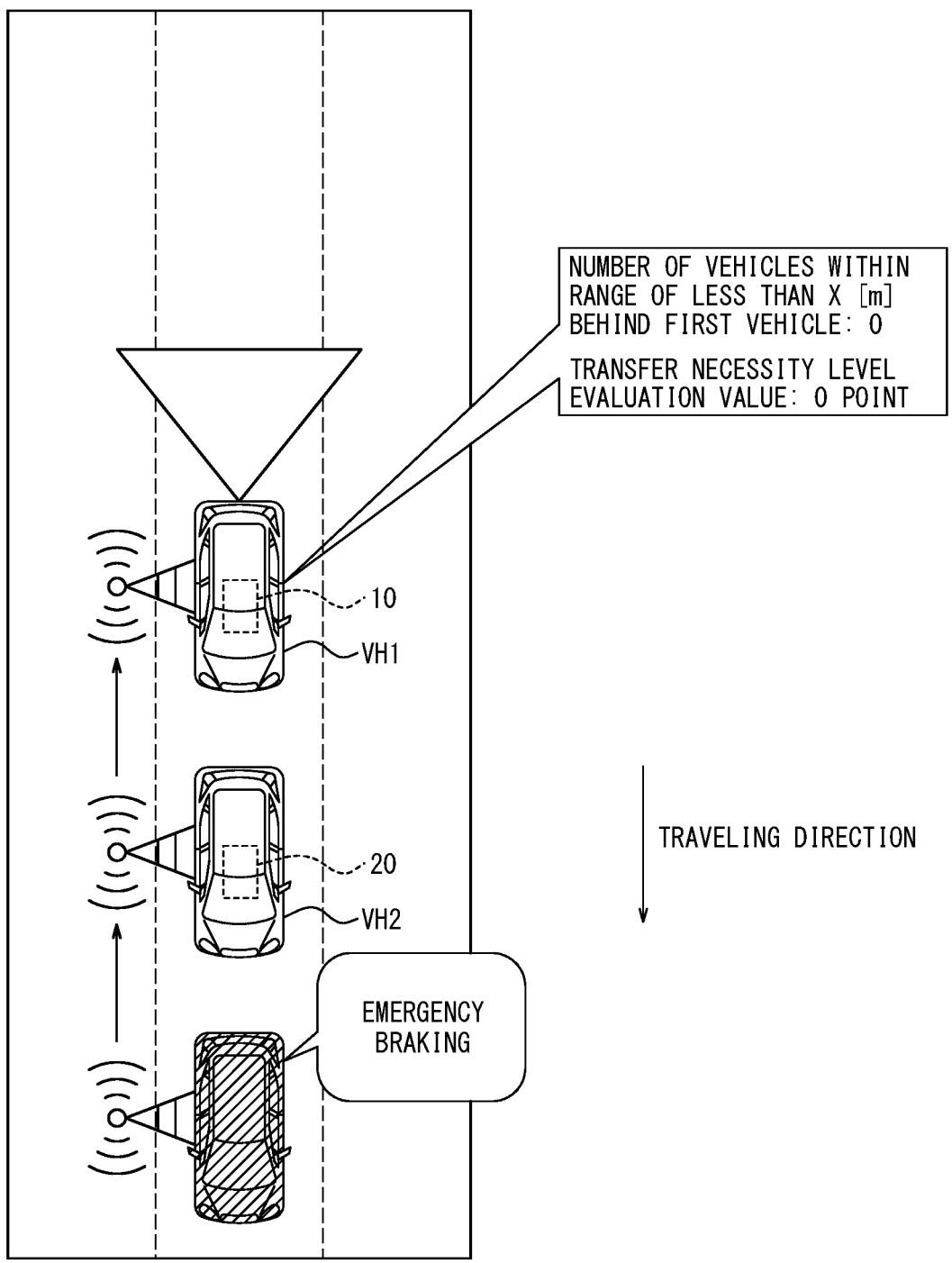
FIG. 18 is a diagram illustrating a communication system according to an embodiment disclosed herein, in which the event is emergency braking.

FIG. 18 illustrates an example method for calculating a transfer necessity level evaluation value by the communication apparatus 10 according to the present embodiment.

In this example, the event is emergency braking.

Emergency brake operation information as the event information is transmitted from a vehicle applying emergency braking, to the communication apparatus 20 of the second vehicle VH2. The communication apparatus 20 of the second vehicle VH2 receives the emergency brake operation information, and transfers the received emergency brake operation information as the event information to the communication apparatus 10 of the first vehicle VH1.

When the occurrence position of the event indicated by the information included in the event information is ahead in the traveling direction of the first vehicle VH1, the controller 11 of the communication apparatus 10 recognizes, as the third vehicle VH3, a vehicle behind in the traveling direction of the first vehicle VH1. Specifically, the event of the emergency braking has occurred ahead in the traveling direction of the first vehicle VH1, the controller 11 recognizes, as the third vehicle VH3, a vehicle behind in the traveling direction of the first vehicle VH1. In this example, the communication apparatus 10 of the first vehicle VH1 checks the status behind the first vehicle VH1 with an autonomous sensor such as a rear camera, and the controller 11 recognizes, as the third vehicle VH3, a vehicle behind in the traveling direction rear of the first vehicle VH1.

The controller 11 determines the state of the third vehicle VH3 in the same manner as illustrated in FIG. 14.

The determination of the status of the third vehicle VH3 by the controller 11 includes determining whether the first distance from the first vehicle VH1 to the third vehicle VH3 is less than the first threshold. In this example, no vehicle is found in the range of less than X [m] behind the first vehicle VH1, the controller 11 determines that the first distance from the first vehicle VH1 to the third vehicle VH3 is equal to or greater than the first threshold. When the first distance from the first vehicle VH1 to the third vehicle VH3 is determined as being equal to or greater than the first threshold, the controller 11 evaluates the necessity level for transfer as being lower than in a case in which the first distance from the first vehicle VH1 to the third vehicle VH3 is determined as being less than the first threshold. In this example, the first distance is determined as being equal to or greater than the first threshold, and thus the controller 11 adds 0 [point].

The controller 11 evaluates the necessity level for transfer, based on the determination of the status of the third vehicle VH3. In this example, the number of vehicles found within the range in which the first distance is less than the first threshold is 0, which means the third vehicle VH3 for which the status should be determined by the controller 11 does not exist. The number of vehicles in the range in which the first distance is less than the first threshold is 0, the transfer necessity level evaluation value is set to 0 [point] by multiplying by "0". The evaluation threshold is 5 [points], and thus the controller 11 determines that the transfer necessity level evaluation value is less than the evaluation threshold.

The controller 11 decides whether to cause the communication interface 13 to perform transfer in accordance with the necessity level. Specifically, when the transfer necessity level evaluation value is less than the evaluation threshold, the controller 11 decides not to cause the communication interface 13 to perform transfer of information. In this example, the transfer necessity level evaluation value is determined as being less than the evaluation threshold, the controller 11 decides not to cause the communication interface 13 to perform transfer of information.

That is, in this example, based on the status of the third vehicle VH3 in which no vehicle is found in the range of less than X [m] behind the first vehicle VH1, the necessity level for transfer is determined as being less than the evaluation threshold and transfer is not performed.

As described above, in this example, the necessity level for transfer of the event information is suitably determined.

In the examples of FIGS. 14 to 18, the first threshold is X [m], the second threshold is Y [m], the third threshold is Z [km/h], and the evaluating threshold is 5 [points], but these thresholds may be different, for example, for each type of events.

As described above, according to the present embodiment, when event information such as emergency braking, road works, or emergency vehicle approaching is received, the controller 11 suitably decides whether to perform transfer of the event information in consideration of the measured peripheral status, and the controller 11 does not perform transfer when it is decided that transfer of the received event information causes annoyance or danger to a driver of a vehicle that is an information transfer target, to thereby reduce transfer of information unnecessary for the driver of the vehicle that is an information transfer target. According to this embodiment, the necessity level for transfer is suitably determined by using the information acquired from the autonomous sensor to thereby perform efficient information transfer, ensuring a safer in-vehicle communication function.

While the present disclosure has been described with reference to the drawings and examples, the present disclosure is not limited to the aforementioned embodiments, and may be subjected to various modifications and alterations based on the present disclosure. For example, the plurality of blocks in the block diagrams may be integrated, or each of the blocks may be divided. The plurality of steps in the flowchart may be executed in parallel or in different order according to the processing capability of the apparatus for executing each step, instead of being executed in chronological order as illustrated. Other than the above, the present disclosure may be changed without departing from the gist of the present disclosure.

The invention claimed is:

1. A communication apparatus mounted on a first vehicle, the communication apparatus comprising:
   a communication interface configured to perform wireless communication with a communication apparatus mounted on a vehicle other than the first vehicle; and
   a controller configured to:
      determine, when event information is received by the communication interface, the event information indicating occurrence of an event and having been transferred from a communication apparatus mounted on a second vehicle different from the first vehicle, a status of a third vehicle different from the first vehicle and the second vehicle, and
      decide, based on a result of the determination, whether to cause the communication interface to perform transfer of the event information to a communication apparatus mounted on the third vehicle, wherein:

the determination includes determining whether a speed of the third vehicle is equal to or greater than a third threshold, the controller is configured to evaluate a necessity level for the transfer based on the result of the determination, and decides whether to cause the communication interface to perform the transfer in accordance with the necessity level, the event information includes information that indicates an occurrence position of the event, and when the occurrence position is ahead in a travel direction of the first vehicle, the controller recognizes, as the third vehicle, a vehicle behind in the travel direction of the first vehicle, and evaluates, when the speed of the third vehicle is determined as being equal to or greater than the third threshold, the necessity level as being higher than that in a case in which the speed of the third vehicle is determined as not being equal to or greater than the third threshold.

2. The communication apparatus according to claim 1, wherein the event includes road works, emergency braking, or approach of an emergency vehicle.

3. The communication apparatus according to claim 1, wherein the event information includes information that indicates an event lane in which the event has occurred, and the determination includes comparing the event lane with a driving lane in which the third vehicle travels.

4. The communication apparatus according to claim 3, wherein when a driver of the third vehicle has performed an operation to change lane from a first lane to a second lane different from the first lane, the controller is configured to compare the second lane as the driving lane with the event lane.

5. The communication apparatus according to claim 3, wherein
when the event lane is determined as being the same as the driving lane as a result of comparing the event lane with the driving lane, the controller is configured to evaluate the necessity level as being higher than that in a case in which the event lane is determined as not being the same as the driving lane.

6. A system comprising:
the communication apparatus according to claim 1; and
a communication apparatus mounted on the second vehicle.

7. The system according to claim 6, further comprising a communication apparatus mounted on the third vehicle.

8. A vehicle on which the communication apparatus of claim 1 is mounted.

9. A non-transitory computer-readable medium storing a communication program configured to cause a computer mounted on a first vehicle to execute operations, the operations comprising:
determining, when event information is received by the communication interface, the event information indicating occurrence of an event and having been transferred from a communication apparatus mounted on a second vehicle different from the first vehicle, a status of a third vehicle different from the first vehicle and the second vehicle, and
deciding, based on a result of the determination, whether to cause the first vehicle to perform transfer of the event information to the third vehicle, wherein:
the determination includes determining whether a speed of the third vehicle is equal to or greater than a third threshold,
the operations further comprise evaluating a necessity level for the transfer based on the result of the determination, and whether to cause the first vehicle to perform the transfer is decided in accordance with the necessity level, and
the event information includes information that indicates an occurrence position of the event, and the operations further comprise, when the occurrence position is ahead in a travel direction of the first vehicle, recognizing, as the third vehicle, a vehicle behind in the travel direction of the first vehicle, and when the speed of the third vehicle is determined as being equal to or greater than the third threshold, the necessity level is evaluated as being higher than that in a case in which the speed of the third vehicle is determined as not being equal to or greater than the third threshold.

10. A communication apparatus mounted on a first vehicle, the communication apparatus comprising:
a communication interface configured to perform wireless communication with a communication apparatus mounted on a vehicle other than the first vehicle; and
a controller configured to:
determine, when event information is received by the communication interface, the event information indicating occurrence of an event and having been transferred from a communication apparatus mounted on a second vehicle different from the first vehicle, a status of a third vehicle different from the first vehicle and the second vehicle, and
decide, based on a result of the determination, whether to cause the communication interface to perform transfer of the event information to a communication apparatus mounted on the third vehicle, wherein:
the determination includes determining whether a speed of the third vehicle is equal to or greater than a third threshold,
the controller is configured to evaluate a necessity level for the transfer based on the result of the determination, and decides whether to cause the communication interface to perform the transfer in accordance with the necessity level, and
the event information includes information that indicates an occurrence position of the event, and when the occurrence position is behind in a travel direction of the first vehicle, the controller recognizes, as the third vehicle, a vehicle ahead in the travel direction of the first vehicle, and evaluates, when the speed of the third vehicle is determined as being equal to or greater than the third threshold, the necessity level as being lower than that in a case in which the speed of the third vehicle is determined as not being equal to or greater than the third threshold.

11. The communication apparatus according to claim 10, wherein the event includes road works, emergency braking, or approach of an emergency vehicle.

12. The communication apparatus according to claim 10, wherein the event information includes information that indicates an event lane in which the event has occurred, and the determination includes comparing the event lane with a driving lane in which the third vehicle travels.

13. The communication apparatus according to claim 12, wherein when a driver of the third vehicle has performed an operation to change lane from a first lane to a second lane different from the first lane, the controller is configured to compare the second lane as the driving lane with the event lane.

14. The communication apparatus according to claim 12, wherein when the event lane is determined as being the same as the driving lane as a result of comparing the event lane with the driving lane, the controller is configured to evaluate the necessity level as being higher than that in a case in which the event lane is determined as not being the same as the driving lane.

15. A system comprising:
the communication apparatus according to claim 10; and
a communication apparatus mounted on the second vehicle.

16. The system according to claim 15, further comprising a communication apparatus mounted on the third vehicle.

17. A vehicle on which the communication apparatus of claim 10 is mounted.

* * * * *